United States Patent [19]
Miller et al.

[11] Patent Number: 4,752,869
[45] Date of Patent: Jun. 21, 1988

[54] AUXILIARY REACTOR PROTECTION SYSTEM

[75] Inventors: William L. Miller, West Deer Township, Allegheny County; James F. Sutherland, Plum Boro, both of Pa.

[73] Assignee: Westinghouse Electric Corp., Pittsburgh, Pa.

[21] Appl. No.: 732,325

[22] Filed: May 9, 1985

[51] Int. Cl.⁴ .............................................. G06F 11/00
[52] U.S. Cl. ...................................... 364/187; 371/36
[58] Field of Search ................... 364/187, 184; 371/3, 371/14, 25, 36

[56] References Cited

U.S. PATENT DOCUMENTS 3,538,498 11/1970 Games ................................... 371/36
3,697,776 10/1972 Matejka ................................. 371/36
3,892,954 7/1975 Neuer ..................................... 371/25
4,180,203 12/1979 Masters ................................. 371/20

Primary Examiner—Jerry Smith
Assistant Examiner—Allen MacDonald
Attorney, Agent, or Firm—Daniel C. Abeles

[57] ABSTRACT

Redundant trip logic microprocessors produce partial trip signals which are voted on by a pair of voters at the power interface to the actuated devices. The logic implemented by each trip logic processor is straight-forward and can be designed for each individual plant. Also included is an automatic tester and testing method which can confirm the accuracy of A/D converters, digital inputs, check the trip points of bistable, verify all the trip and voting logic, and measure the time response of each channel. The test subsystem uses a microcomputer to control the isolation of the analog field sensor signals and digital contact signals from the analog and digital inputs, control the generation and/or injection of various combinations of reference and test signals, and monitor the response of the trip logic processors and voter to the test signals.

21 Claims, 38 Drawing Sheets

AUXILIARY REACTOR PROTECTION SYSTEM

BACKGROUND OF THE INVENTION

1. Field of the Invention

The invention relates to an auxiliary protection system for pressurized light water nuclear power plants. More particularly, the invention includes a method and microprocessor-based tripping apparatus for tripping the main stream turbine or initiating other mitigating action to maintain primary system pressure within acceptable limits in the event that a transient occurrence, such as loss of heatsink or loss of feedwater, is accompanied by a failure of a main reactor protection system. The system also includes an integrated automatic tester and tester method which allows testing to occur while the tripping apparatus is on-line thereby increasing the availability of the tripping apparatus.

2. Description of the Related Art

The United States Nuclear Regulatory Commission (NRC) defines an anticipated transient without scram (ATWS) as an expected operational occurrence (such as a loss of feedwater, loss of condenser, or loss of off-site power to the reactor) which is accompanied by a failure of the reactor protection system to shut down the reactor. Because the NRC considers the probability of the occurrence of an ATWS event to be unacceptably high, the NRC has amended its regulations to require nuclear plant operators to install additional protection equipment to detect such transients and initiate mitigating action. For Westinghouse plants, this action consists of tripping the main steam turbine within thirty (30) seconds and initiating flow of auxiliary feedwater within sixty (60) seconds since those steps are sufficient to limit primary system pressure to 3200 pounds per square inch (PSIA).

Presently, pressurized light water nuclear reactor power plants are protected by a single main protection system whose availability is ensured by a redundant design philosophy as illustrated in FIG. 1. Four redundant sets of field sensors 10 transmit signals which represent process variables to four signal processors or channel sets 11 which generate partial trip signals. The channel sets 11 each compare an analog input signal from the sensors 10 with a setpoint and when the set point is exceeded, the digital type partial trip signal is sent to voters 12. The partial trip signals are voted on by the voters 12 using a two-out-of-four (2/4) basis to provide both reliabilty and protection against spurious trips. Further protection against spurious trips is provided by having two such voters 12 whose outputs are voted using a two-out-of-two (2/2) basis at the power interface 13 to the actuated devices 14. The voters 12 produce actuation signals for left L and right R relays whose contacts are arranged to produce the two-out-oftwo vote. The relay contacts on the left side of the power interface 13 must both be closed to start the device 14 while the relay contacts on the right must both be open to stop the device 14. Because each level of redundancy is composed essentialy of multiple sets of the same equipment, the NRC is concerned with the possibility of common-cause or common mode failures.

FIG. 2 is an example of a primary reactor protection system which also includes testers 15 for the trip logic units 16. The testers 15 do not test the signal input units 17 nor do the testers test the partial trip logic within each tester or the relays which are included within the actuators. The testers 15 only test the entire test logic. The details of the system of FIG. 2 can be found in U.S. Pat. No. 3,892,954 to Neuner assigned to the assignee of the present invention.

SUMMARY OF THE INVENTION

It is an object of the present invention to provide redundant two-of-three voting for partial trip signals at a power interface to actuated devices in a lightwater pressurized nuclear reactor auxiliary protection system to improve availabiity of the auxiliary protection system and to minimize inadvertent actuations.

It is another object of the present ivention to provide a logic system with a secondary redundant input-voted output protection system implemented using hardware and software of a different type from those employed in the primary protection system in order to minimize the possibility of common failure modes.

It is a further object of the present invention to provide an auxiliary protection system having a microprocessor-based automatic tester whch controls the isolation of analog signals from field sensors and contact signals from contact inputs, controls the generation and injection of reference and test signals, and monitors the response of the system to those in order to check: the calibration of the analog channel and A/D converters, the reaction of digital inputs, the response time of each channel, the trip points of set point comparisons in each channel, and the implemented partial and complete trip logic.

It is an additional object of the present invention to provide a test system to generate external reference or test signals and inject those signals as well as on-board reference signals into one or more channels under test.

It is still another object of the present invention to provide a test system in which on-board reference signals are configured into various input combinations and monitor the response of the partial trip logic in order to verify the partial trip logic.

It is a further object of the present invention to isolate the information feedback path to the tester from the partial trip signal output path to reduce the possibility of adverse interactions between the test system and the trip system and between trip subsystems by providing separate trip logic buses associated with each trip logic processor, each of which communicates with a common test system bus by way of serial communications devices.

It is an object of the present invention to prevent adverse interaction between the test system and the trip system by using dual port RAM devices associated with each trip logic processor and the test system processor to communicate feedback to the tester while outputting partial actuaton signals directly from digital I/O devices associated with each trip logic processor.

It is another object of the present invention to provide a trip system which includes redundant partial trip logic.

It is still another object of the present invention to provide a method of producing an auxiliary reactor protection system trip signal using redundant partial trip logic and redundant voting to insure that the protection devices are properly activated.

It is still a further object of the present invention to provide an auxilary reactor protection system testing method which allows the components of the protection logic and actuation system to be tested.

It is yet another object of the present invention to provide an auxiliary reactor protection system that has a high confidence level of actuation.

The above objects can be accomplished by the present invention which comprises a method and microprocessor-based apparatus for initiating mitigating actions, such as a turbine trip, or auxiliary feedwater initiation and which is intended to serve as a back-up for an existing protection system in a nuclear power plant and which tests itself.

Three redundant trip logic processors generate partial trip signals which are voted on by a pair of two-out-of-three voters at the power interface to the actuated devices. The logic implemented by each trip logic processor is straight-forward and can be designed for each individual plant. The invention also includes a tester and testing method which can confirm the accuracy of input signal conditioning circuits, A/D converters, digital inputs, check trip points of set point comparisons, test all the trip logic and trip relays, and measure the time response of each channel. The test subsystem uses a microcomputer to control the isolation of the field sensor signals and contact signals from the analog and digital inputs, control the generation and/or injection of test reference signals, and monitor the response of the trip logic processors and voters to the test reference signals.

These together with other objects and advantages which will be subsequently apparent reside in the details of construction and operation as more fully herinafter described and claimed, reference being had to the accompanying drawings forming a part hereof, wherein like reference numerals refer to like parts throughout.

DESCRIPTION OF THE PREFERRED EMBODIMENTS

The present invention includes an apparatus for initiating mitigating actions, such as a turbine trip, or auxiliary feedwater initiation, which serves as a back-up for an existing protection system in a nuclear power plant and which tests itself.

Figure 1:
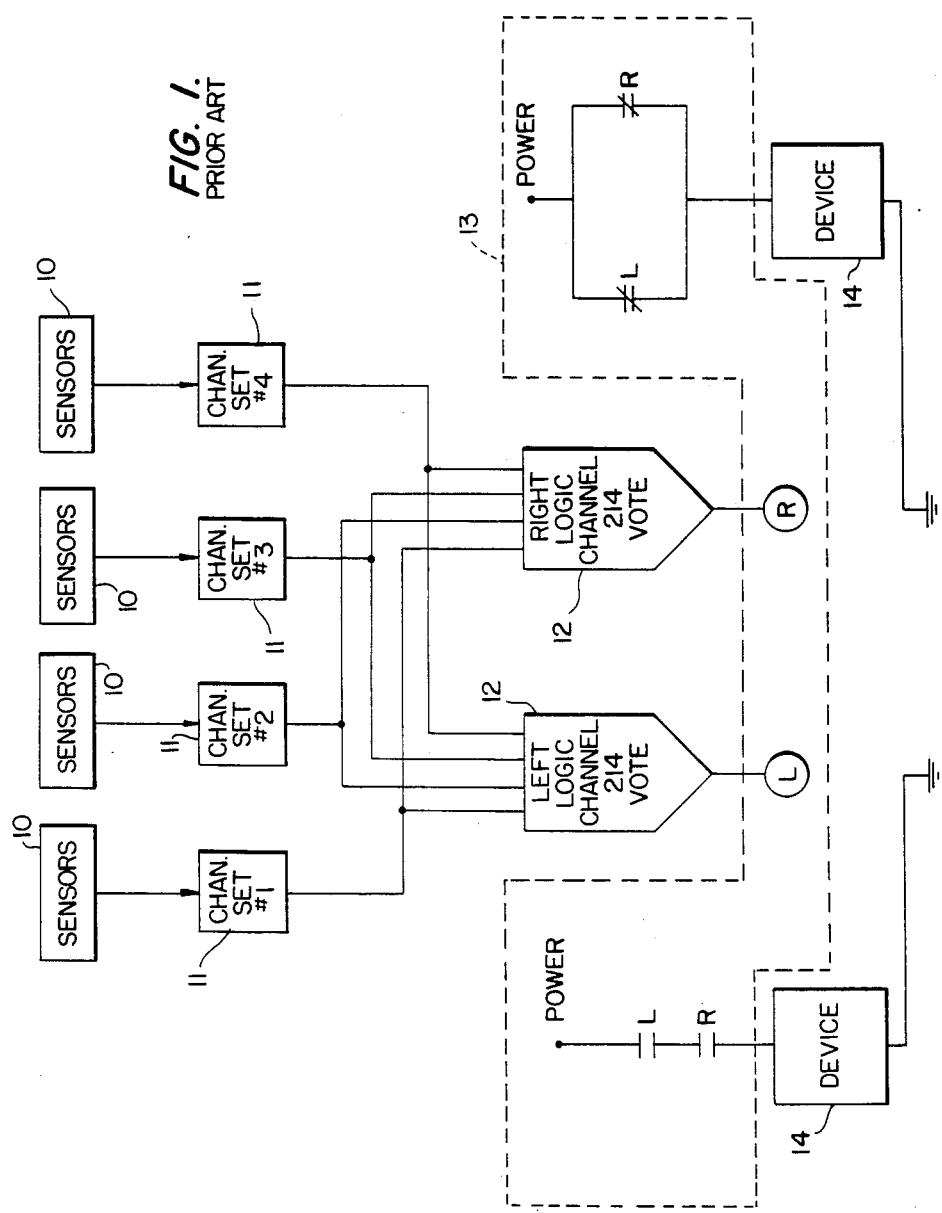
FIG. 1 is a block circuit diagram of a prior art primary protection system for a pressurized light water nuclear power, plant.
Figure 2:
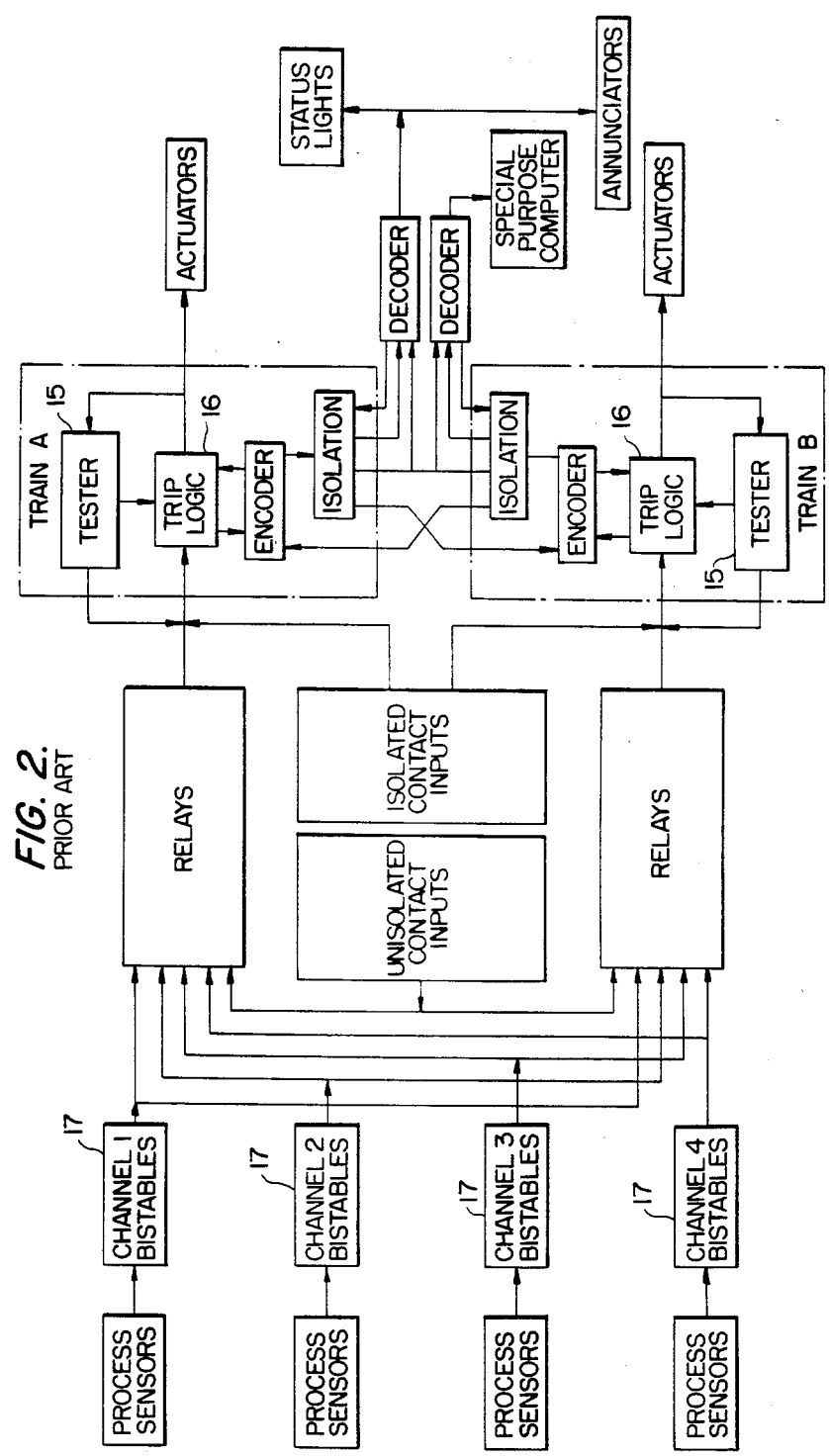
FIG. 2 is a block circuit diagram of a prior art primary protection system including trip logic testers 15.
Figure 3:
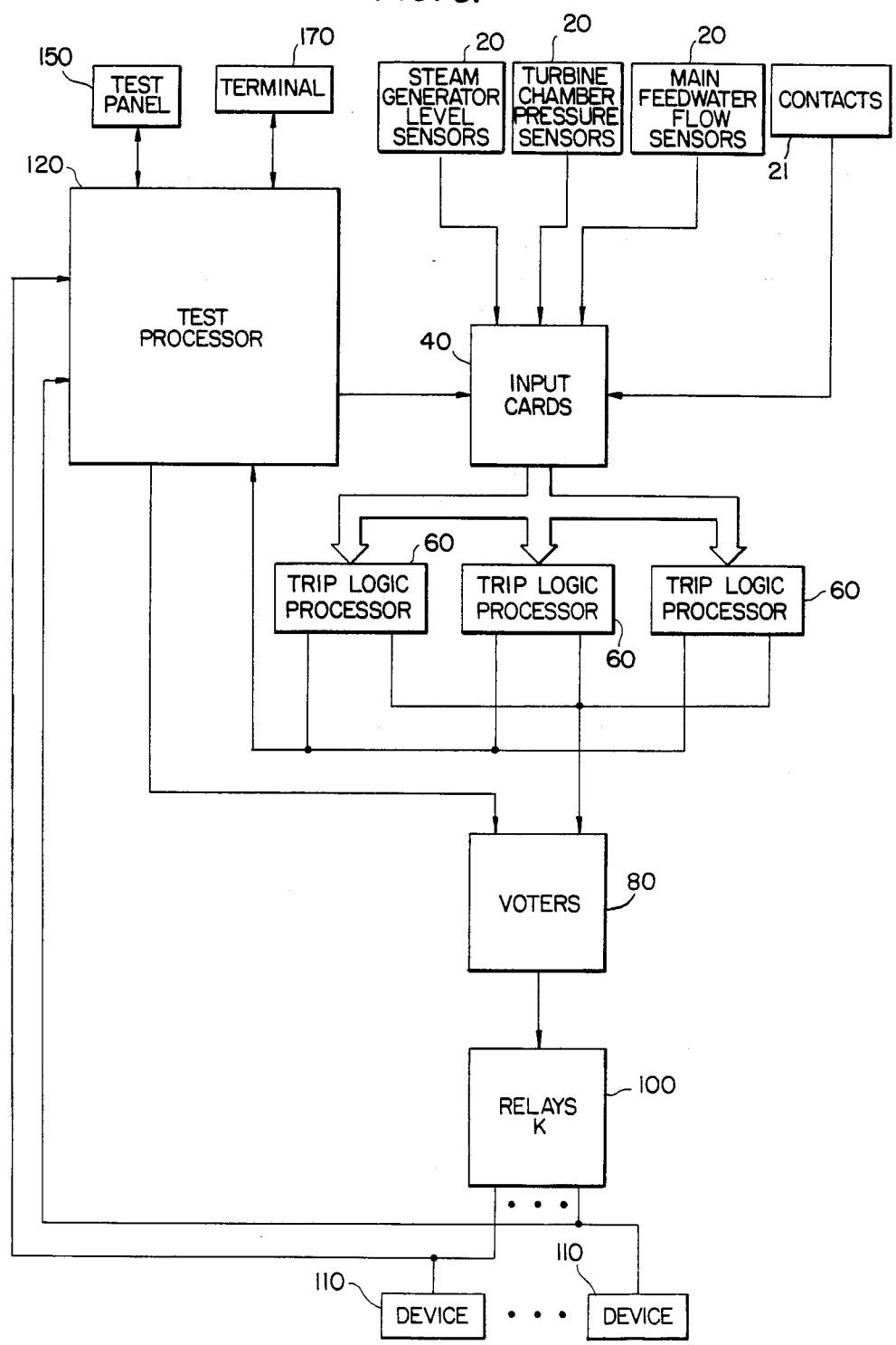
FIG. 3 is an overall block diagram of an embodiment of the present invention.

The general operation of the invention may be understood by reference to FIG. 3. Analog signals and digital signals from various sensors 20 and dry contacts 21 representing the process variables and contact positions are input to the system by way of input cards 40. The input cards 40 include analog cards each having one or more analog input channels and digital cards each having one or more digital input channels. The input cards 40 perform the necessary analog and digital signal conditioning functions, such as surge protection, filtering, and buffering. The signals emanating from the input cards 40 are distributed to each of three redundant trip logic processors 60. Each trip logic processor 60 performs predetermined logic functions and, upon appropriate inputs, generates a partial actuation or trip signal which is output to voters 80. Voters 80 then generate an actuation signal based upon a two-out-of-three vote of its inputs which activates relays 100. Status, annunciation, and plant computer inputs are also produced by each trip logic processor 60 and used to produce visual and auditory signals to plant operators. The relays 100 in turn activate the reactor protection devices 110.

The invention also includes a test processor 120 which can confirm the accuracy of A/D converters, check digital inputs, check the trip points of the set point comparisons, verify the analog and digital trip logic, and measure the time response of each channel. The test processor 120 controls the isolation of the field sensor and contact signals from the inputs, controls generation of and/or injection of test reference signals, and monitors the response of the trip logic processors 60 and voters 80 to the test reference signals. The test processor 120 can be controlled from either a test panel 150 or a terminal 170.

Figure 4A:
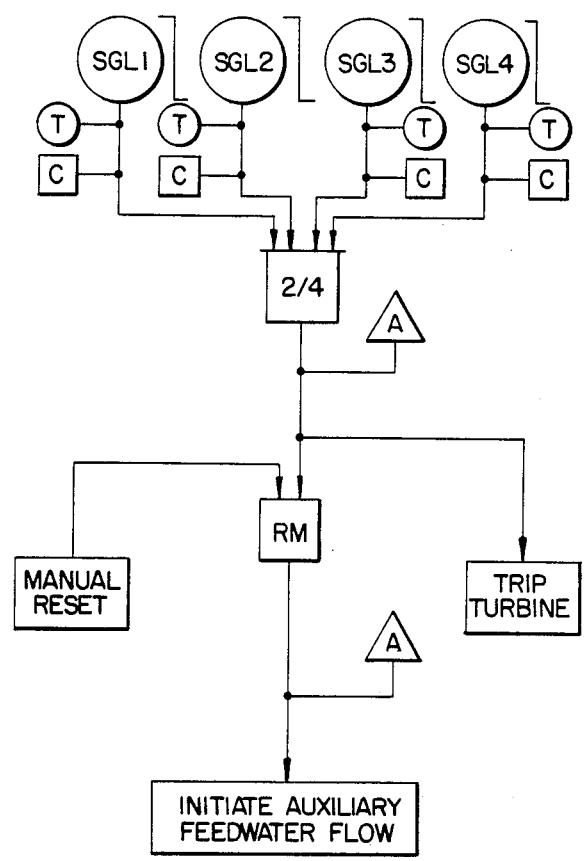
FIG. 4, including 4A–4C, is a diagram of an example of partial trip logic and status monitoring points of the trip logic processors 60 in FIG. 3.
Figure 4B:
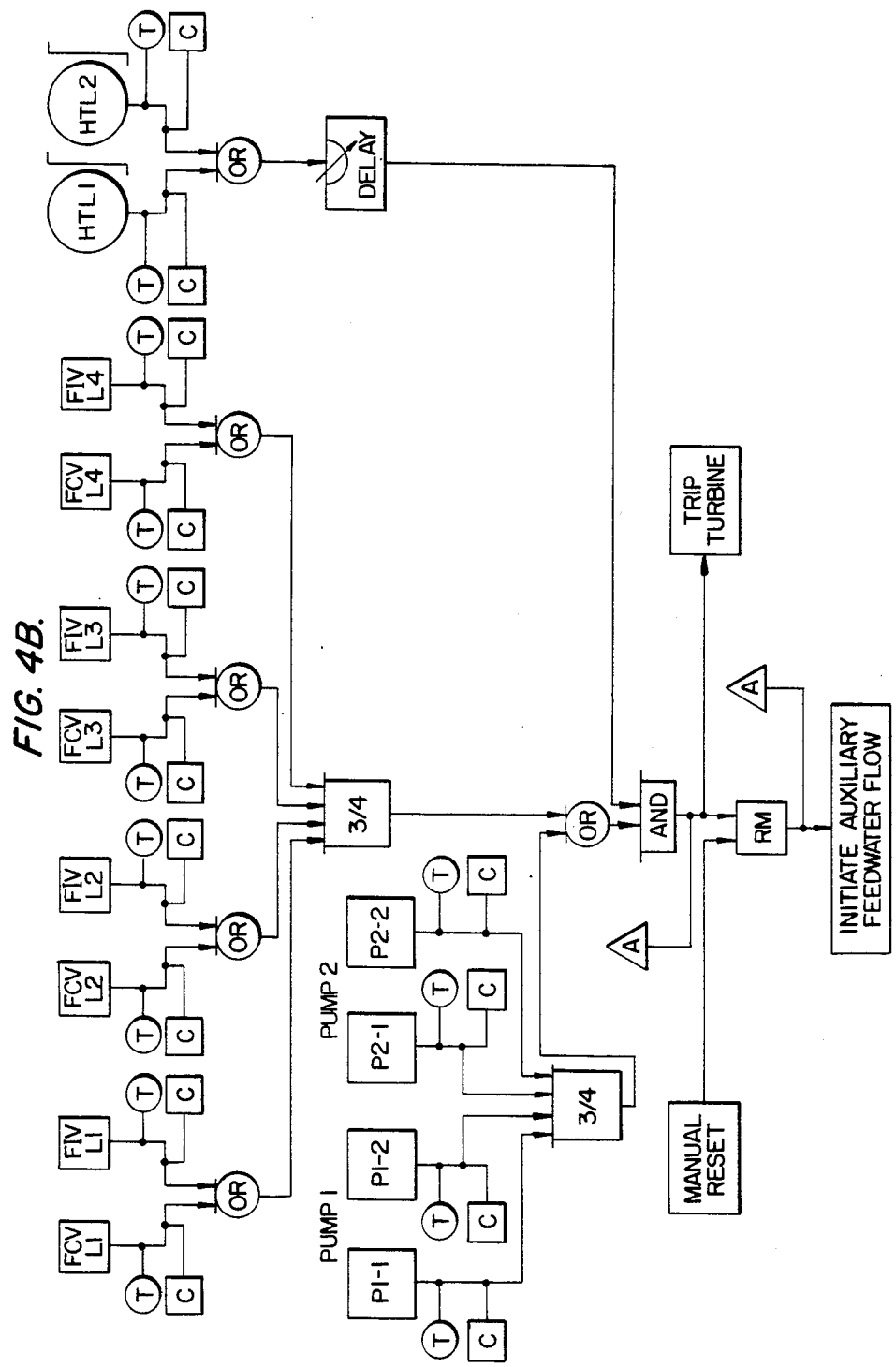
Figure 4C:
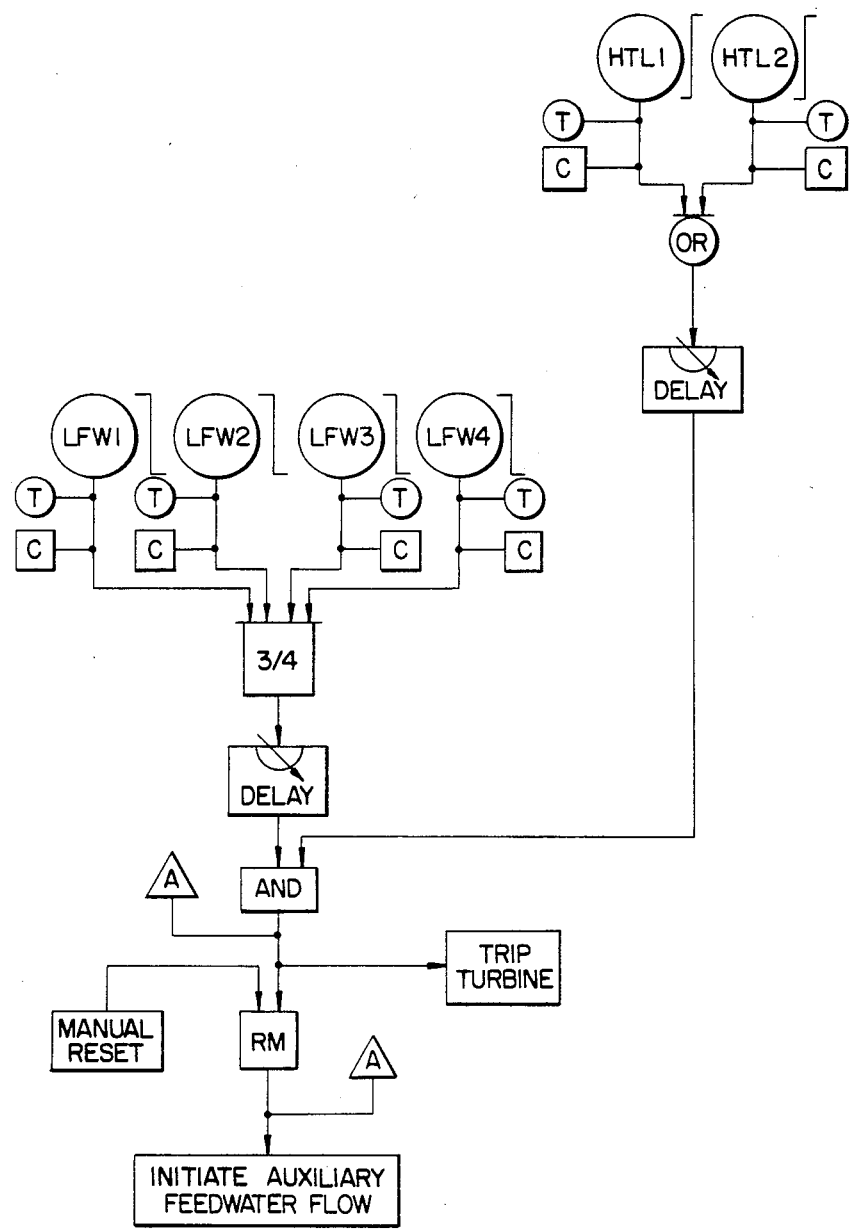

FIGS. 4A–4C are an example of one type of or actuation logic executed by each of the trip logic processors 60 and voters 80 when used with a standard Westinghouse nuclear power plant. Auxiliary feedwater flow and turbine trip, as illustrated in FIG. 4A, are initiated when a 2 out of 4 vote of low-low steam generator level sensors SGL1-SGL4 indicate a low main feedwater level. The initiation of auxiliary feedwater is continued until the retentative memory RM is manually reset. In FIG. 4B, auxiliary feedwater flow and turbine trip are initiated when a 3 out of 4 vote of ORed feedwater control valve limit switches FCVL1FCVL4 and feedwater isolation valve limit switches FIVL1-FIVL4 are closed or when feedwater pump contacts P1-1, P1-2, P2-1 and P2-2 are closed for pumps 1 and 2, respectively, and when any high turbine load sensor HTL1-HTL2 indicates a high load after a delay of from 30 to 100 seconds. In FIG. 4C, initiation occurs when a 3 out of 4 vote of low feedwater flow sensors LFW1LFW4 indictes low feedwater and when turbine load is high.

The trip logic for nuclear power plants other than standard Westinghouse plants would be different from that of FIG. 4; however, one of ordinary skill in the art could generate a diagram similar to that of FIG. 4 and produce the necessary flowchart and trip logic program for each trip logic processor 60 from study of the main protection system at the power plant to which the present invention is to be applied. The generation of a program for sampling the sensor inputs, voting on the inputs, ANDing and ORing the results to produce the partial trip signal is within the ordinary skill in the art. The circle with a T therein indicates partial trip status monitoring, the triangle with an A therein indicates where annunciator outputs should be produced while the square with the C therein indicates where plant computer inputs are produced. These outputs to the plant operators can also be provided by software developed by a person of ordinary skill in the art.

Figure 5A:
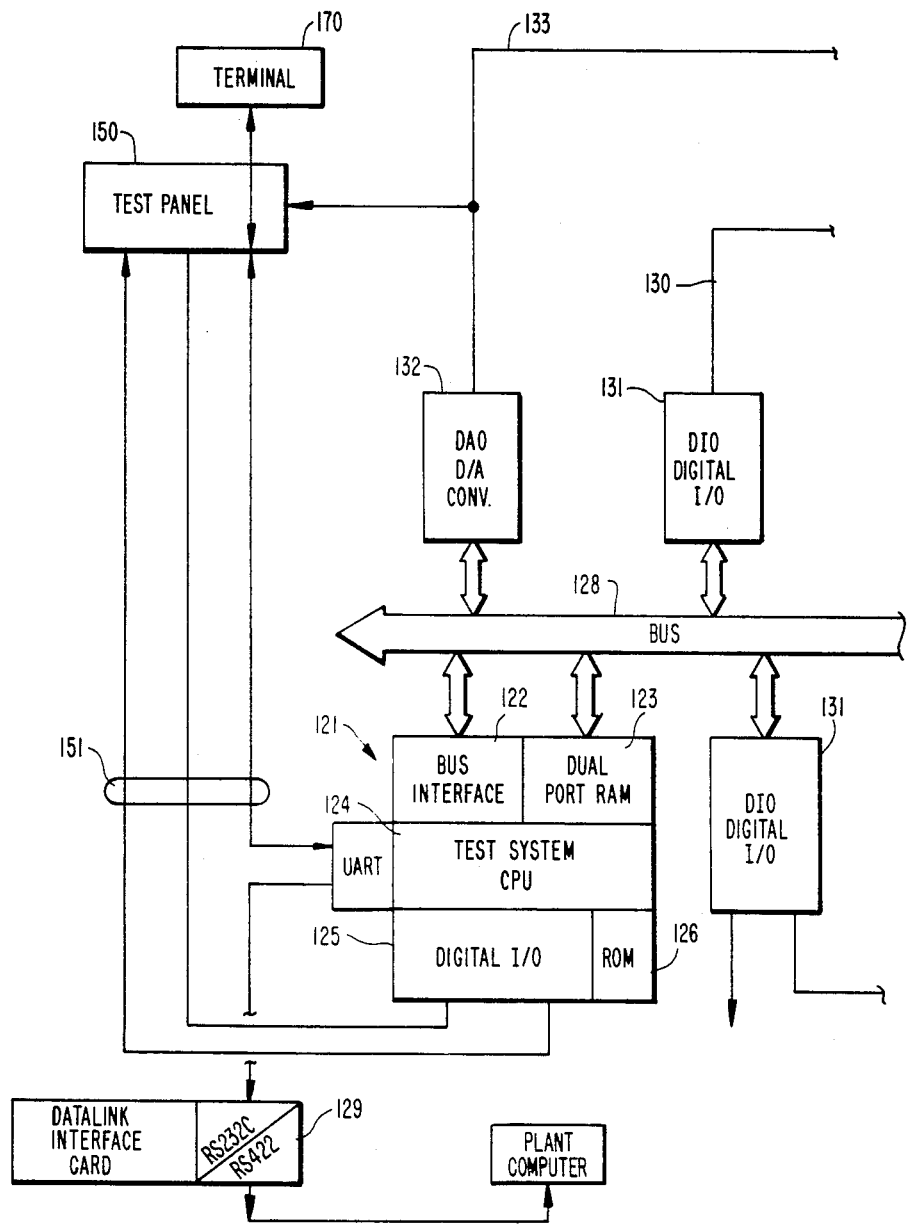
FIG. 5, including 5A and 5B, is a more detailed block diagram of the system of FIG. 3.
Figure 5B:
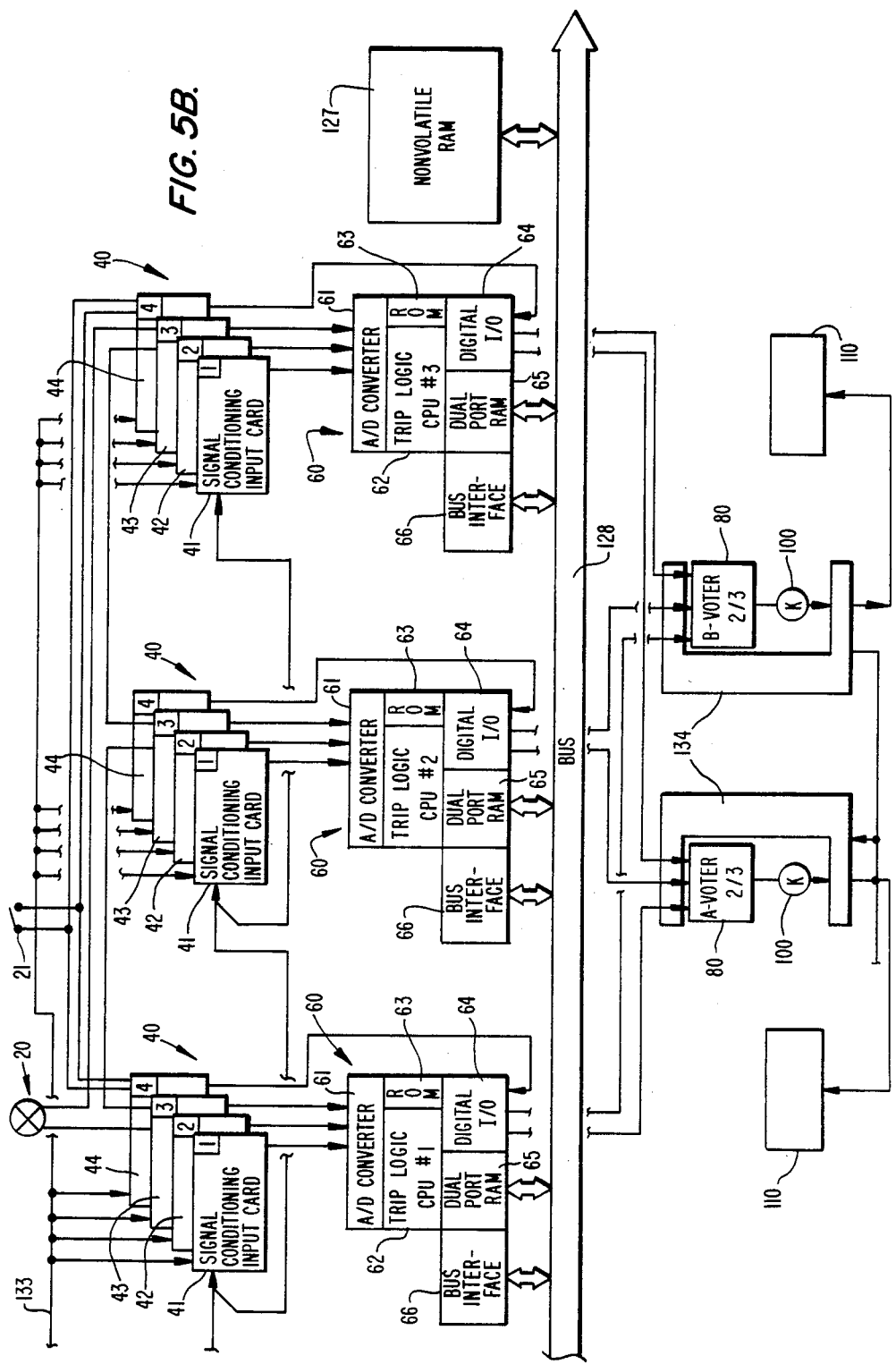

FIG. 5 is a more detailed diagram of the present invention. At the input level where the field sensor 20 and contact 21 input signals interface with the system are four signal conditioning input cards 41-44 for each trip logic processor 60. Each group of signal conditioning input cards includes three analog cards 41-43 with four analog channels on each card and a digital input card 44 including eight digital channels. Identical input signals are conditioned and passed along to each trip logic processor 60.

Each trip logic processor is a single board computer, such as Intel SBC 88/40, which includes an A/D converter 61, a processor 62, a read only memory 63, a digital input/output unit 64, a dual port random access memory 65 and a bus interface 66. The ROM 63 can have stored therein the initialization procedures, input/output procedures and partial trip logic procedures necessary to perform the partial trip logic as illustrated in FIG. 4 and to provide the necessary outputs to the test processor 120 and voters 80. The Intel 88/40 single board computer is the preferred version of the trip logic processor 60 since it includes all of the components discussed above. Detailed information concerning the operation and programming of the Intel SBC 88/40 can be found in iSBC 88/40 Measurement and Control Computer Hardware Reference Manual, 1981, by Intel Corporation. Each trip logic processor 60 during normal operation produces a partial trip signal in accordance with predetermined trip logic, for example, as illustrated in FIG. 4, and the trip signal is transferred to each voter 80. The voters 80 produce an actuation signal as necesary which energizes relays 100 which actuate the protection devices 110 which correspond to solenoid valves, etc. in the field.

The test processor 120 includes a single board board computer 121 which, in the preferred embodiment is an Intel SBC 88/45 single board computer. The single board computer 121 includes a bus interface 122, a dual port RAM 123, a test system processor 124, a digital input/output unit 125 and a ROM 126. Detailed information concerning the operation and programming of the Intel SBC 88/45 can be found in iSBC 88/45 Advanced Data Communications Processor Board Hardware Reference Manual, 1983, by Intel Corporation. The ROM can store the test system control program and test routines or it can store an initial program load algorithm which accesses and loads the test system control program and routines from nonvolatile RAM (NVRAM) 127 using the system bus 128. NVRAM 127 also stores system level set points, gain and offset values and sensor flags so that a common set of values is used and also so that a power failure will not require re-entry of all the values.

The test system processor 124, during normal operation, goes out onto the bus 128 through the bus interface 122 and gathers status information from the dual port RAMs 65 of each trip logic processor 60. The dual port RAM 65 are used to minimize the use of the bus 128 and avoid bus contentions, maintain trip logic independence and act as a buffer between the trip logic processors 60 and the test processor 121. The status information from each trip logic processor 60 is compared with the status information from the other trip logic processors 60 and an alarm is initiated if the status information does not agree. This alarm condition is passed on to the plant computer through a standard computer data link interface card 129. Trip logic system tests and test processor tests can be initiated at the test panel 150 and conducted through a terminal 170; for example, the calibration operation can be initiated at the test panel 150.

Once a month, according to NRC regulations, it is necessary to complete a test of the trip logic system which is initiated at test panel 150 and conducted through terminal 170. The test panel 150 includes light emitting diodes which indicate when testing, normal operation or calibration is occurring, as well as the status of various indicators as discussed with respect to FIG. 4, along with test points for calibrating the analog signal injection line 133.

The test system processor 124 provides a menu to the terminal 170 during the trip logic testing process and the test results can be monitored at the test panel 150 or the terminal 170. The tests are executed in the following sequence: 1) each analog channel is tested individually to verify operation of the analog signal conditioning card 41-43 circuitry, the A/D converter 61 and the set point comparison performed by the processor 62; 2) each trip logic processor 60 is tested individually including input siganls from the input cards 40 and outputs to the voters 80; and 3) the voting by voters 80 and continuity of relays 100 is tested. It is also possible to perform maintainance and calibration of the system using the terminal 170.

During a test of the analog input cards 41-43, the A/D converter 61 and the set point comparison, the input signals from sensors 20 are disconnected at the input cards 41-43 through test control signals produced by the single board computer 121. The test control and enable line 130 transmits command signals from the test system processor 124 via a single board digital input/output unit 131. The digital input/output unit 131 in the preferred embodiment is the Intel SBC 519 programmable I/O expansion board, the operation of which is described in detail in the SBC 519 Programmable I/O Expansion Board Hardware Reference Manual. After the inputs are disabled, test values are produced by the single board computer 121 and converted into analog signals by single board digital-to-analog D/A converter 132. The D/A converter 132 in the preferred embodiment is the Datel Model ST-716 A/D board, the operation of which is described in detail in Model ST-716 D/A Board User's Manual, 1983, by Datel Intersil. The analog test signal (reference signals) are transferred to the analog input cards 41-43 over analog signal injection line 133. Only one analog input channel is connected to the analog signal injection line 133 at a time. The reference signal is ramped up and down to simulate a change in the measure potential (flow, level, etc.) and the test system processor 121 checks the accuracy of the signal conditioning circuitry, A/D conversion and set point comparison performed by processor 62.

The second test encompasses the trip logic processors 60 from the input signals from the input cards 40 through to the outputs to the voters 80. This test is performed individually on each trip logic processor 60 to enable testing on-line. The input signals from sensors 20 and contacts 21 ar disconnected at the input cards 41-44 for the selected trip logic processor 60 via board enable signals transmitted by the test control and enable lines 130 from the test system processor 124 to the input cards 41-44. After all inputs to the trip logic processor 60 are disabled, test control signals are transitted via the test control and enable lines 130 to the input cards 41-44 to command the signal selection relays on board the input cards 41-44 to select various on-board references. Reference signals are available on the analog input cards 41-43 for simulating inputs at either the low end of the range (GND) or the high end of the range (Vref). Therefore, these signals are used to simulate sensor 20 inputs as being either above or below their set points and are used to exercise various conbinations of the trip logic. Likewise, the digital input card 44 can simulate inputs to the card as being either opened or closed and are used to exercise the trip logic. It is possible to provide an exhaustive combination of reference signals to all the analog and digital channels available such that every combination of input signals is provided to the trip logic processor 60 from the input cards 40. The trip logic processor 60 at the end of each input variation stores the status information in the dual port RAM 65 which is accessed by the single board computer 121 and compared with the expected values. Also, the single board computer 121 receives the trip logic processor 60 outputs to the voters 80 from voter test units 134 and compares these values. If the expected values do not agree with the values stored in dual port RAM 65 and the voter inputs, a failure indication of the appropriate trip logic processor 60 is produced on the terminal 170. This test is repeated for each of the trip logic processors 60.

During a test of voters 80, voter test units 134 are accessed through the digital input/output unit 131, and the voters 80 have applied thereto a combination of inputs sufficient to test the voters 80 and associated relays 100. Each test unit 134 monitors the coil signals of relays 100 and transfers the results back to the digital input/output unit 131 which is then accessed by the test system processor 124 and compared to the expected results. If the single board computer 121 detects a failure, such is indicated on terminal 170. This voter 80 and relay 100 test is performed on one set of relays at a time to permit on-line testing.

Figure 6:
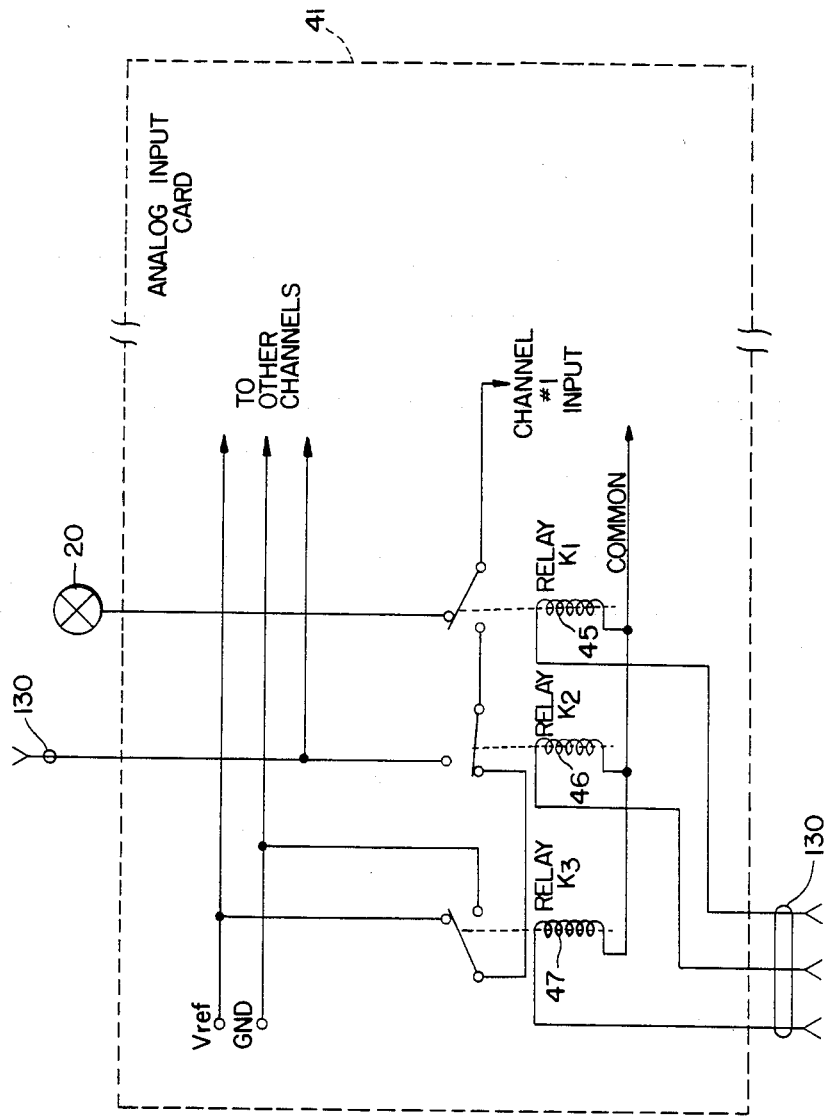
FIG. 6 is a partial diagram of the analog input cards 41–43 of FIG. 5.

FIG. 6 illustrates a simplified example of an analog input card and the relays 45-47 which control the various tests. The analog input card can be purchased from Westinghouse. The reference voltage Vref must be a high precision reference so that accurate tests and calibration can be conducted.

Figure 7:
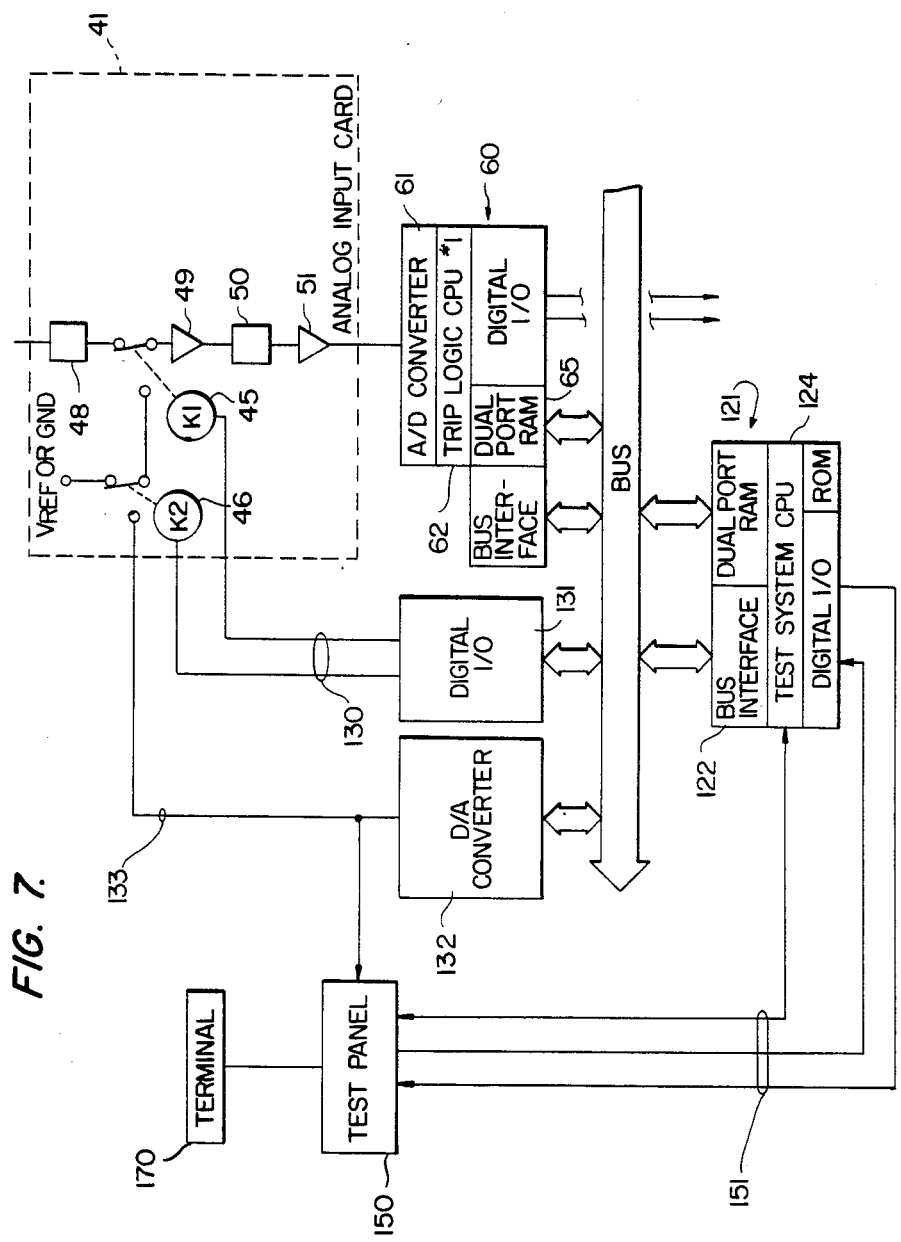
FIG. 7 is a block diagram used to explain channel and set point testing of the logic processors of FIG. 5.

FIG. 7 illustrates the major system components used during a test of the analog channels, including signal conditioning circuits, and set points. At the beginning of this test, the terminal 170 would be turned on and the test panel 150 would be placed in the test mode. On a terminal menu, the user would select this test and could then select semiautomatic or manual. See FIGS. 16(A-B) for flowchart details of this test. The single board computer first accesses the kl relay 45 and disconnects the input from the surge protection device 48 which receives the input from the appropriate field sensor 20. Only the kl relays of one card 41-43 are switched at a time which allows the remaining cards 40 to be on line. The k2 relay is then energized and the external reference line from D/A converter 132 is connected. The test processor then supplies a series of values to the D/A converter 132 so that a ramp signal is produced by the D/A converter 132. The ramped reference signal would then pass through differential amplifier 49, low pass filter 50 and isolation amplifier 51 to the A/D converter 61 of the trip logic processor 60. The trip logic CPU 62 stores the converted value and changes a trip point flag when necessary in dual port RAM 65. The test system CPU 124 then accesses dual port RAM 65 through bus interface 122 and monitors the trip point bits stored in dual port RAM 65. During this process, only the inputs for a single trip logic processor 60 are varied and due to the two-out-of-three voting performed by voters 80, an actual trip will not occur.

During this test, when the input reference signal is ramped up, it passes through the set point range for the particular sensor which such should be indicated concurrently therewith in the set point flags stored in RAM 65 and which are used in the trip signal logic algorithm illustrated in FIG. 4. That is, when the sensor value reaches the range of the set point for a particular sensor, a single bit in the dual port RAM 65 will be changed from zero to one by the set point change logic of the trip logic processor 60. The test system, which also monitors the actual input value measured by the trip logic processor 60, checks the set point flag to determine when they have changed. If the input test reference signal indicates that a set point bit should have changed, and the set point bit has not changed, the test CPU 124 indicates a failure of the set point comparison logic and input channel for the particular sensor 20 on the terminal 170.

As mentioned above, the test CPU 124 stores the digital value of the sampled reference signal produced by D/A converter 132 in RAM, compares the sample to the input value of the reference signal, and indicates a failure if the difference is greater than an expected range.

At the end of this routine, the gain of the channel is calculated and a gain offset is calculated and stored in the NVRAM 127 and shared RAM 65 of the appropriate trip logic processor 60.

Figure 8:
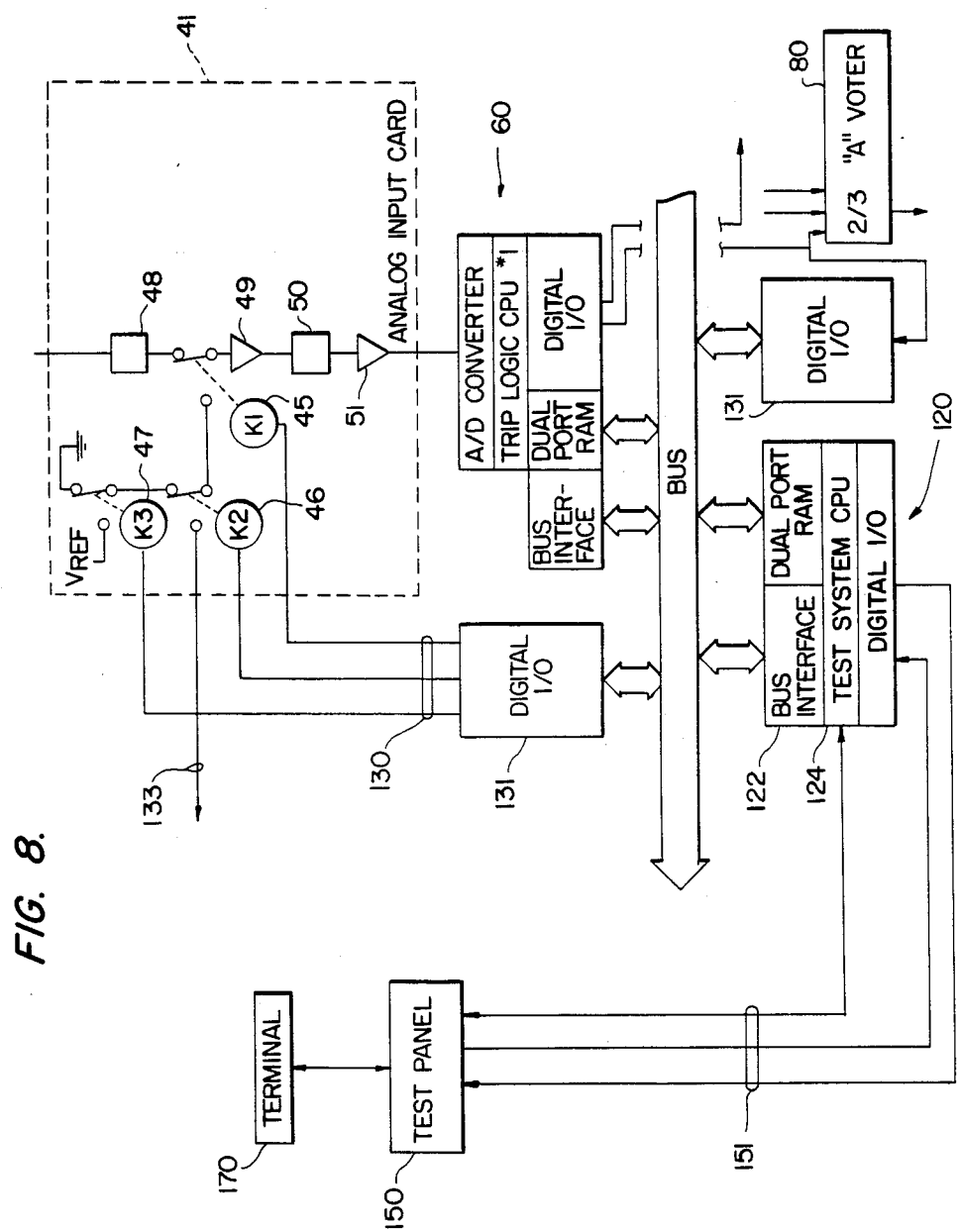
FIG. 8 is a block diagram used to explain periodic testing of the logic processors of FIG. 5.

FIG. 8 will be used to describe a partial trip logic test which tests the predetermined partial trip logic algorithm, such as, for example, illustrated in FIG. 4. During this test, the inputs to all the analog and digital input cards 40 associated with a single trip logic processor 60 are disconnected so that various combinations of input signals can be produced to exercise the entire partial trip logic. During this process, even though a trip signal will be produced by the selected trip logic processor 60, actuation of the protection devices 110 does not occur because each voter 80 requires at least two partial trip signals. The testing time associated with this test must be minimized if possible so that a failure of a nontested trip logic processor 60 will not cause an inadvertent trip of the protection devices 110. It is possible to test all logic combinations or to structure this test so that only those essential combinations of input signals are toggled testing only the essential portions of the set point logic are tested. The essential logic test set should be selected such that a high confidence level is achieved for the entire system and purely random selection would not be appropriate. The particular sequence of logic test signal combinations is predetermined and stored in ROM 126. See Figs. 17(A-B) for flowchart details of this test.

At the beginning of this test, the test processor 120 through the digital input/output unit 131 activates all of the K1 relays 45 associated with each input card 40 (analog 41-43 and digital 44) for the respective trip logic processor 60, thereby completely disconnecting all inputs to the processor 60. The relay 46 is not activated or is held at the internal reference position by the output of the digital input/output unit 131. Various combintions of Vref and GND are produced by energizing the K2 relays 47 on the input card associated with the trip logic processor 60. The value of the ground voltage is well below the set point threshold and the value of the Vref voltage is well above the set point threshold and will cause the set point flags in the trip logic processor 60 to be toggled. During the production of the various reference voltage combinations, the trip logic processor 60 executes the logic of FIG. 4 and the test system CPU 124 samples the partial trip signal output of the trip signal processor 60 through the digital input/output unit 131. Whenever the input combination produces an erroneous partial trip signal, the test processor 120 indicates such on the terminal 170.

The reference voltage Vref can also be used to calibrate and adjust the gain and offset for the analog input cards 41-43, as discussed with respect to FIG. 19.

Figure 9:
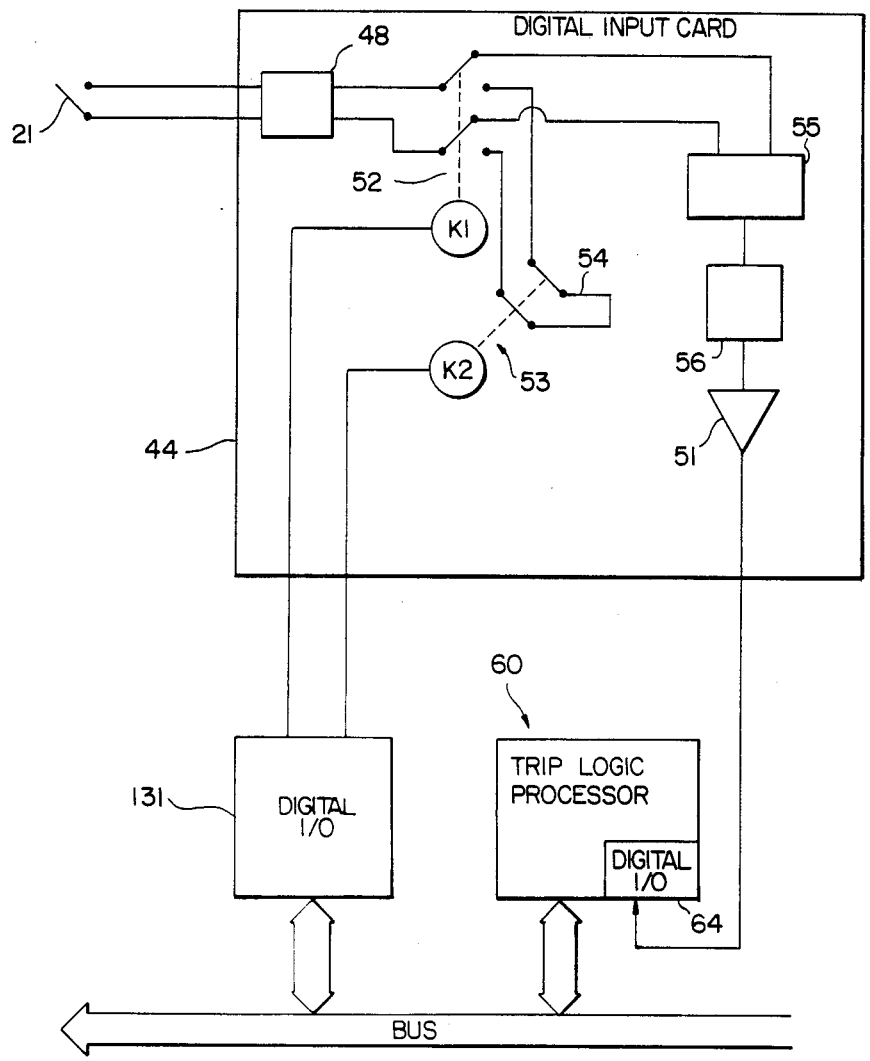
FIG. 9 is a diagram the digital input card 44 of FIG. 5.

FIG. 9 illustrates a digital input card 44 which is controlled in the same manner as the analog cards when a partial trip logic test is being performed. The testing through the digital input card would normally be run concurrently with the testing of the partial trip signal logic performed through the analog input cards. That is, the K1 relay 52 is switched from contact 21 to the K2 relay 53 by the test enable control lines and then the K2 relay 53 is switched to and from current loop 54. The signal through the contact 21 of loop 54 is detected by voltage detector 55 and held temporarily by hysteresis current 56 before while being sent to the trip logic processor 60 through isolation amplifier 51. The inputs produced by the digital input card 44 are input to the trip logic processor 60 through the digital I/O portion 64.

Figure 10:
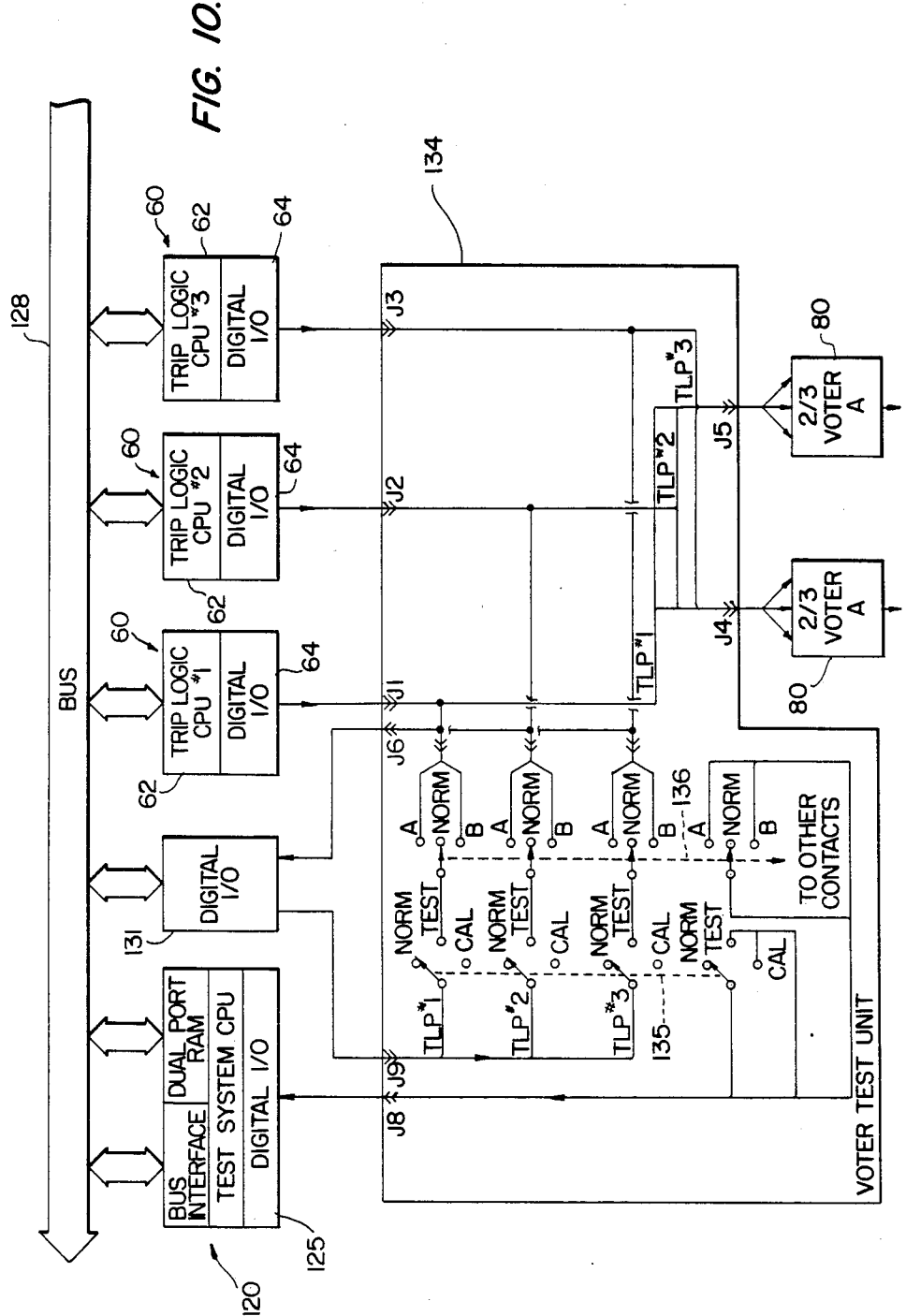
FIGS. 10 and 11 are diagrams used to explain the testing of the voters 80 of FIG. 5.
Figure 11:
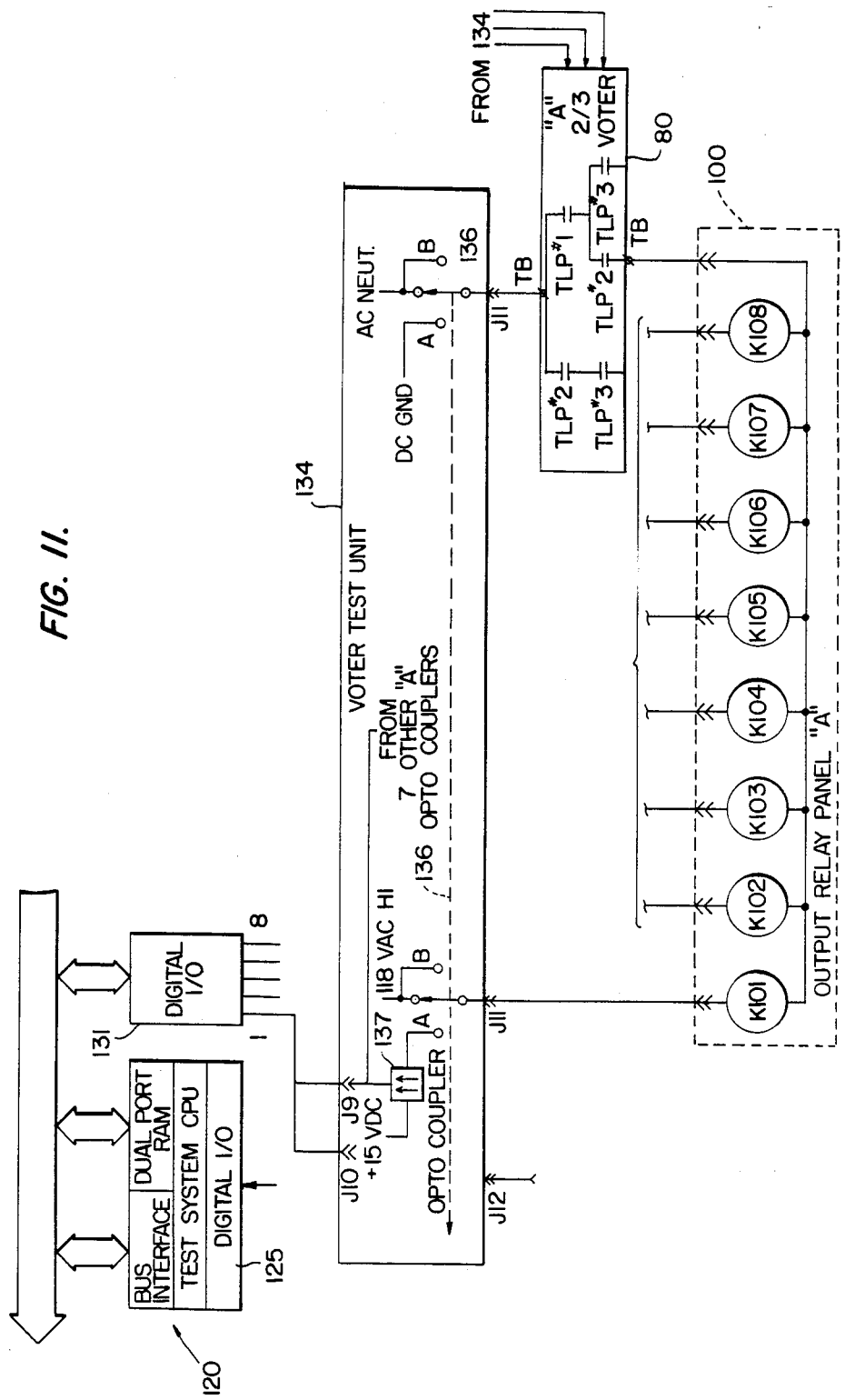

FIGS. 10 and 11 will be used to explain the testing of voters 80 using voter test units 134. The major components of the voter test units 134 could be incorporated into the test panel 150 if desired. During this test, a mode selector switch 135 on test panel 150, which is a key type switch, is switched from normal to test. Another switch 136 on the test panel is activated to select the particular voter to be tested. These switches are multiple pole switches and provide a connection from the digital input/output unit 131 through to the particular voter 80. The positions of switches 135 and 136 are detected by digital input/output unit 125 of test processor 120 and must be in the proper state for the test to begin. During this test, all combinations of voter input signals are generated by test processor 120 and output through digital input/output unit 131. The voter test signals are injected into the voters through the multiple pole switches 135 and 136. The voter test signals are applied to the voter 80 illustrated in FIG. 11 and the voter relays receive either the voter test signals from the test processor 120 or the partial trip signals from the trip logic processors 60 via the voter test unit 134. Also at the beginning of this test, when multiple pole switch 136 is activated, a connection is made between optocouplers 137 and relay coils 101-108, for example, k101, and between DC GND and voter 80 so that the 118 volt AC relay actuation voltage is changed to a 15 volt DC test actuation signal which will not energize the relays k101-k108 during the test. As the various combinations of test signals are injected into voter 80, when a proper combination of test signals is applied, a connection is made through voter 80 thereby allowing a low level current to pass through relays 100, for example, k101, so that optocoupler 137 is activated to send a test feedback signal to digital input/output unit 131. This test signal is sampled by test processor 120 and compared to the expected value. Not only does this test test the logic of voter 80, but continuity through the coils of the relays 100. When the test result is not the same as the expected value, a failure of the voter is indicated on terminal 170. This test is performed on one voter 80 and its associates relays to permit on-line testing.

Even though the voter 80 is illustrated in FIG. 11 as being constructed from relays, it is possible to construct the voter 80 from AND and OR logic circuits or from a single board computer and associated software.

Since the voter test units 134 can be part of the test panel 150, it is possible to feed the partial trip signals from the trip logic procssors 60 to LED indicators on the test panel as well as feed the actuation signals from the voters 80 to the test panel.

Figure 12:
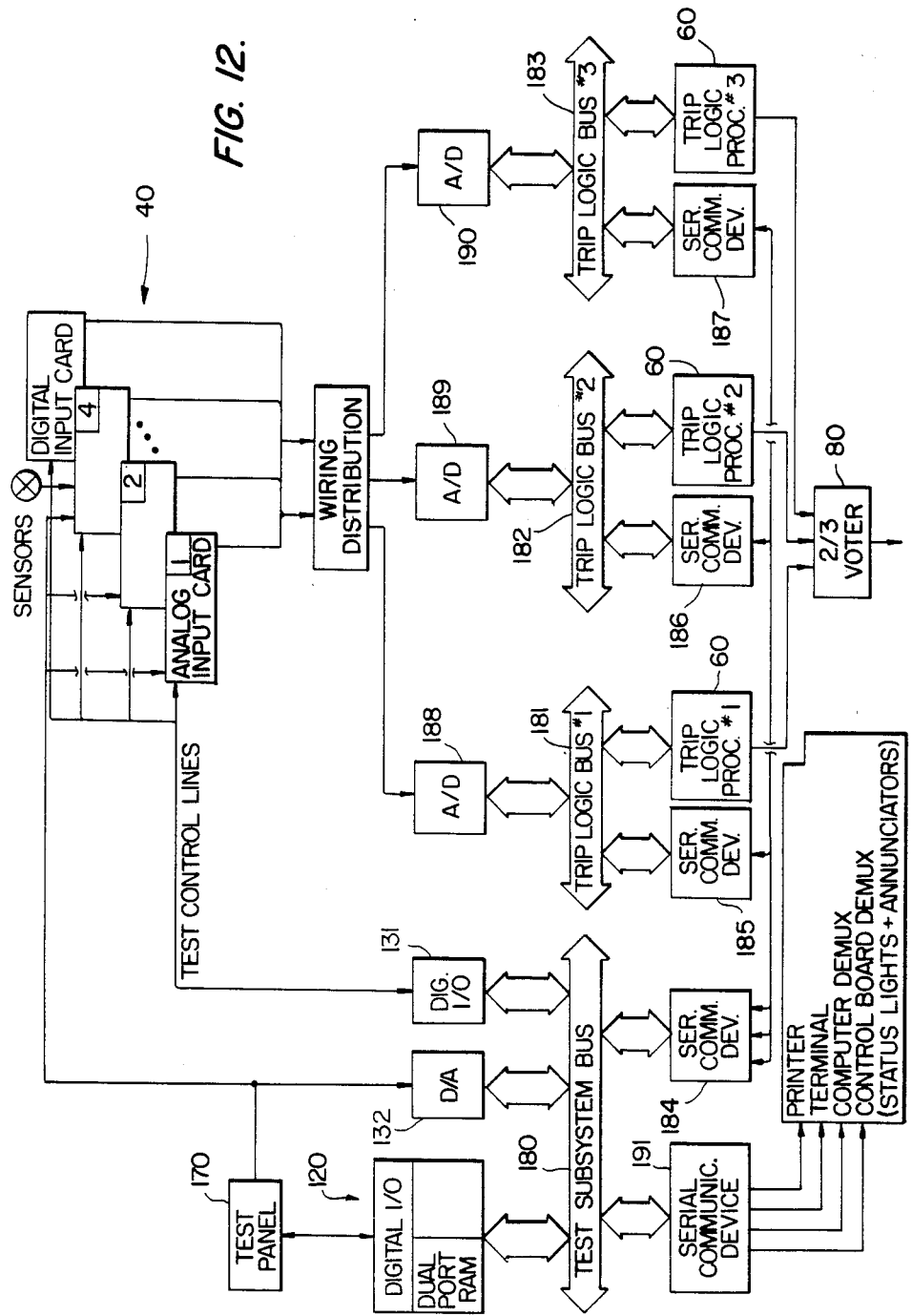
FIG. 12 is a block diagram of an alternate embodiment of the apparatus of the present invention.

FIG. 12 illustrates an alternate embodiment for the apparatus of the present invention. In this embodiment, separate buses 180-183 are provided for each trip logic processor 60 and the test processor 20. As a consequence, it is also necessary to provide serial communication devices 184-187 for communicating between the trip logic processors 60 and the test processor 120. The alternate embodiment would require minor modifications to the various programs which arewithn the level of ordinary skill in the art. It is also possible to provide separate A/D converters 188-190 for each of the trip logic processors 60. This arrangement prevents a failure of a single bus from catastrophically causing a common failure in the auxiliary protection system. It is also possible to provide an additional serial communication device 191 for communication between the test processor 120 and various peripheral devices as indicated.

Figure 13A:
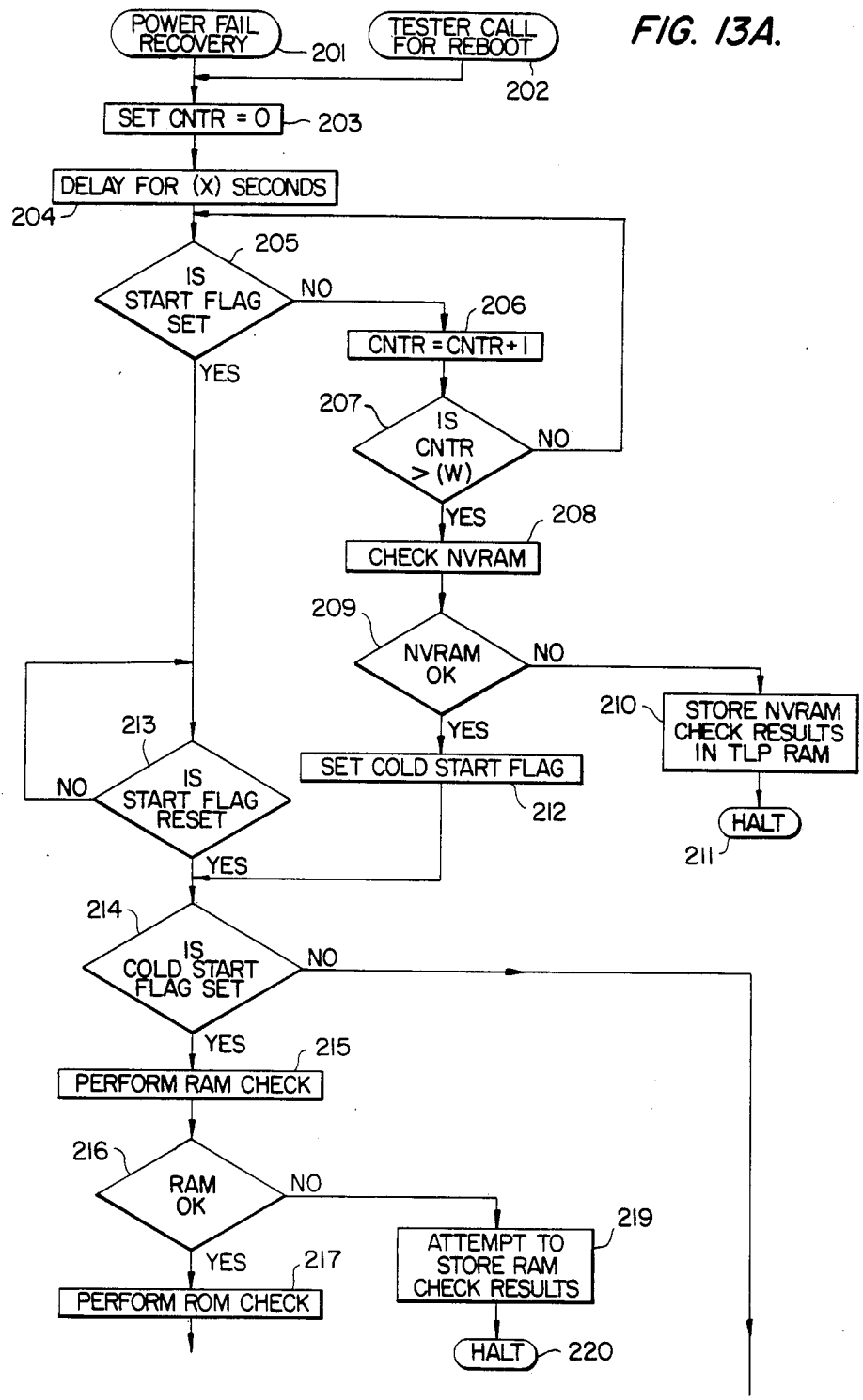
FIGS. 13 (A–C) comprise a flowchart of the program executed by each trip logic processor of FIG. 5.
Figure 13B:
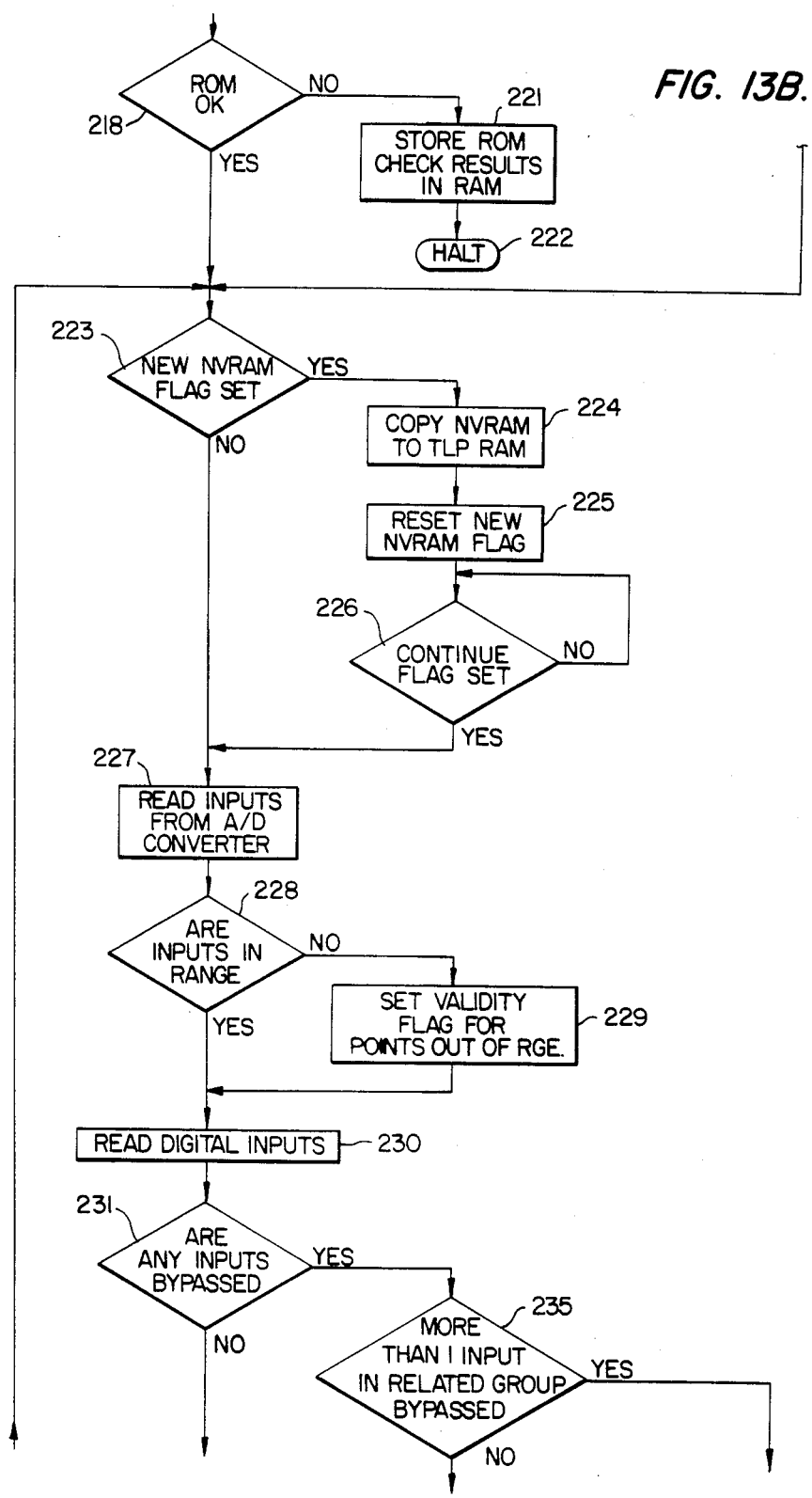
Figure 13C:
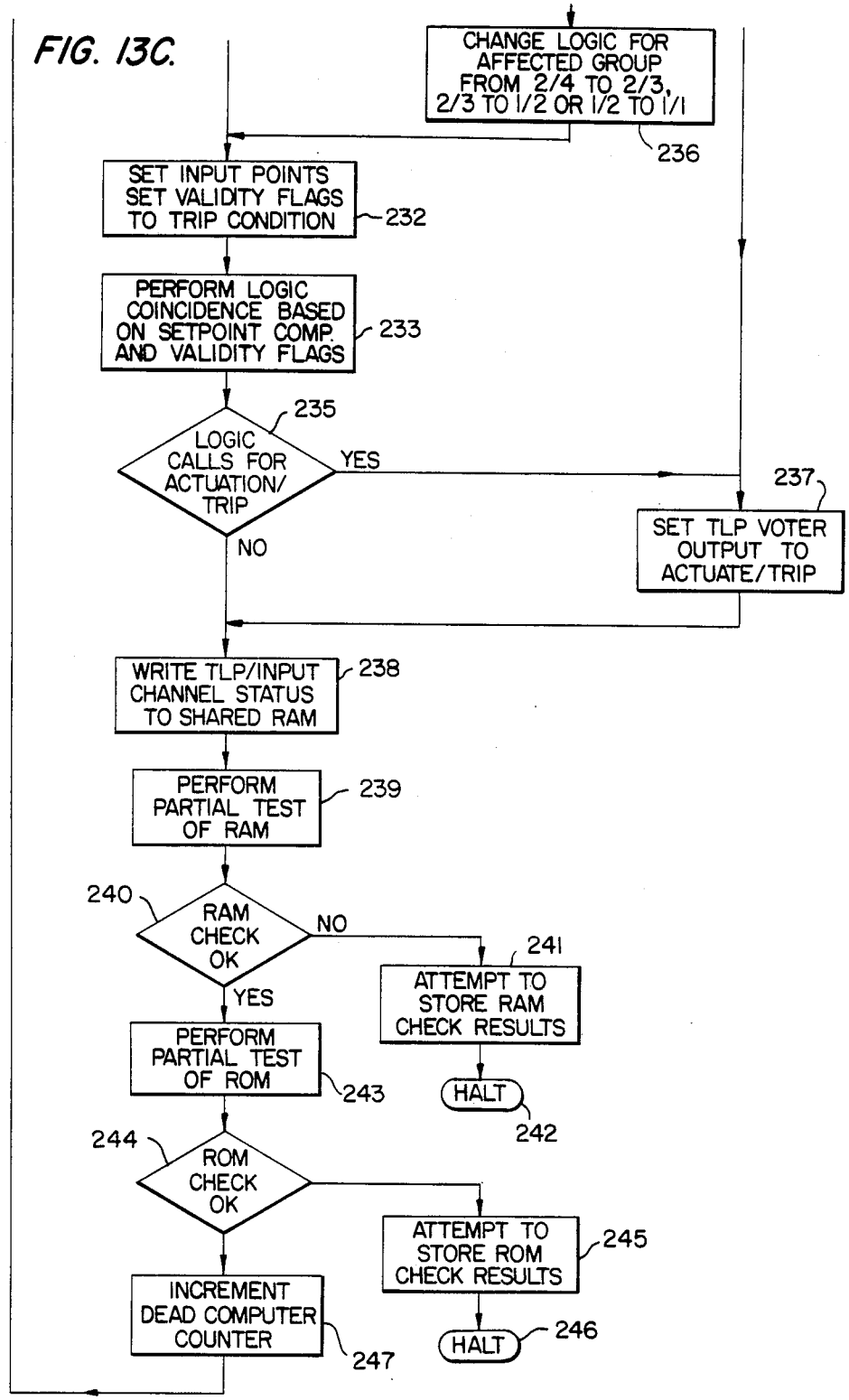
Figure 14A:
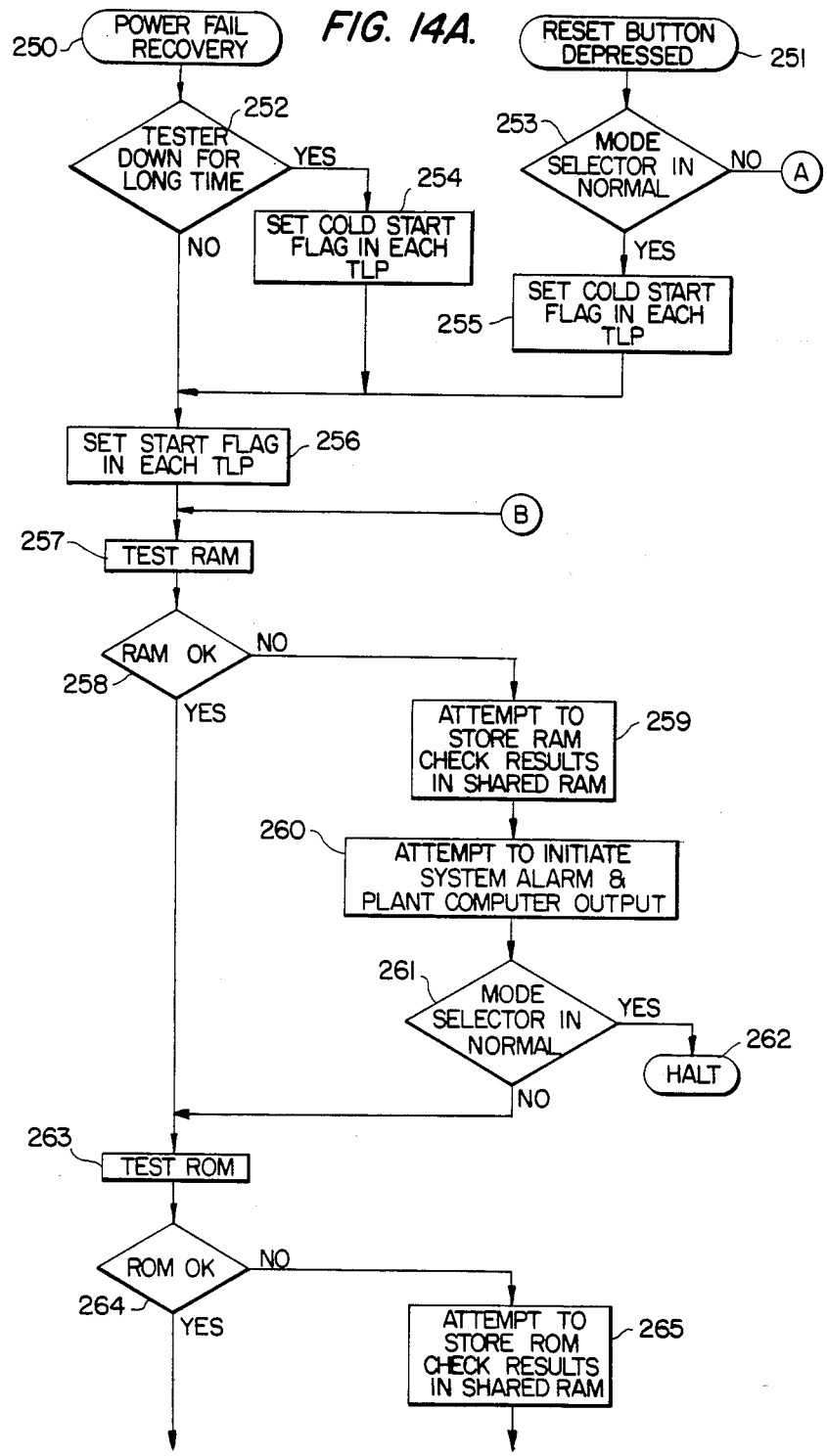
FIGS. 14(A–G) comprises a flowchart of the control program executed by the test processor of FIG. 5.
Figure 14B:
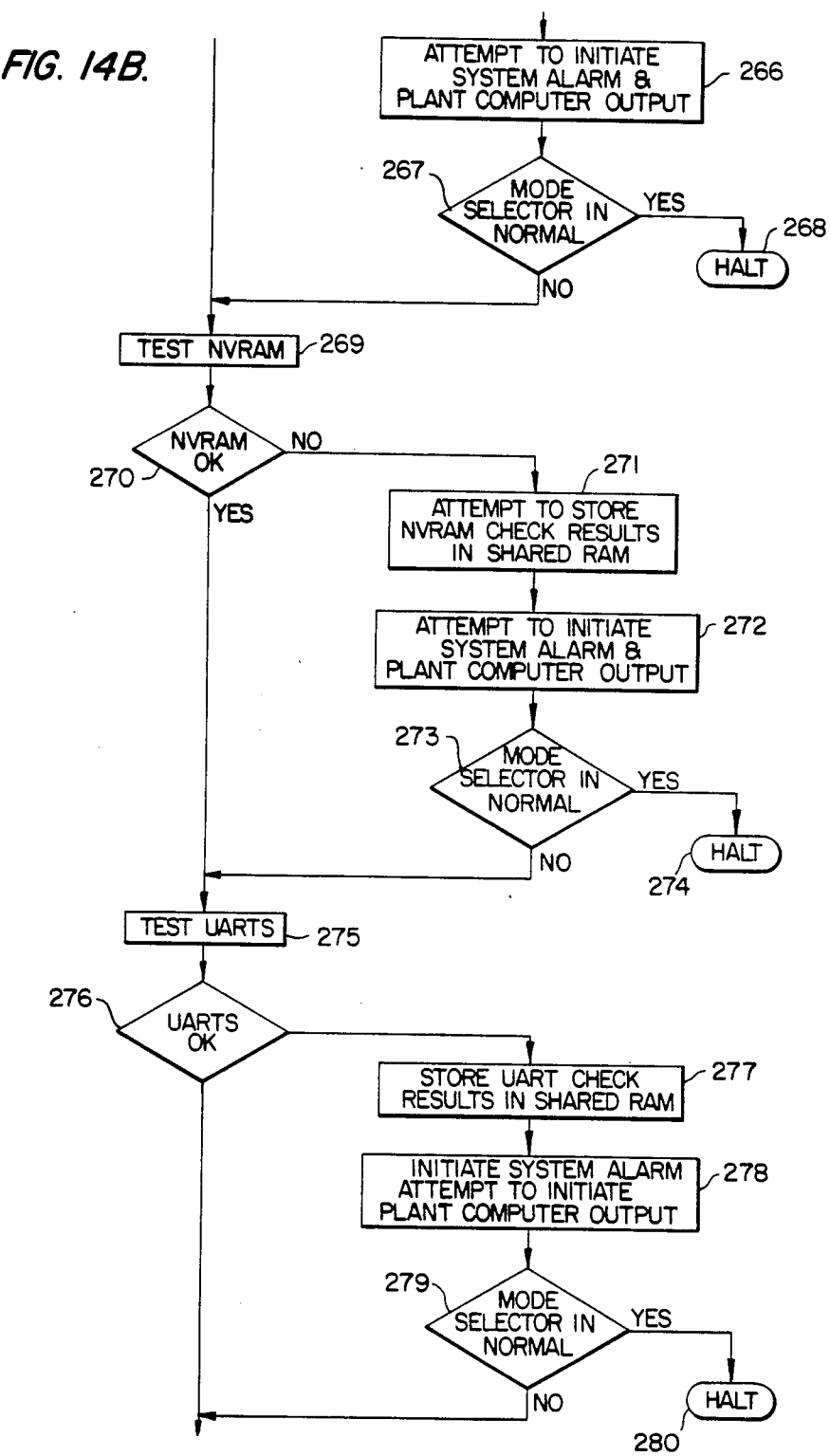
Figure 14C:
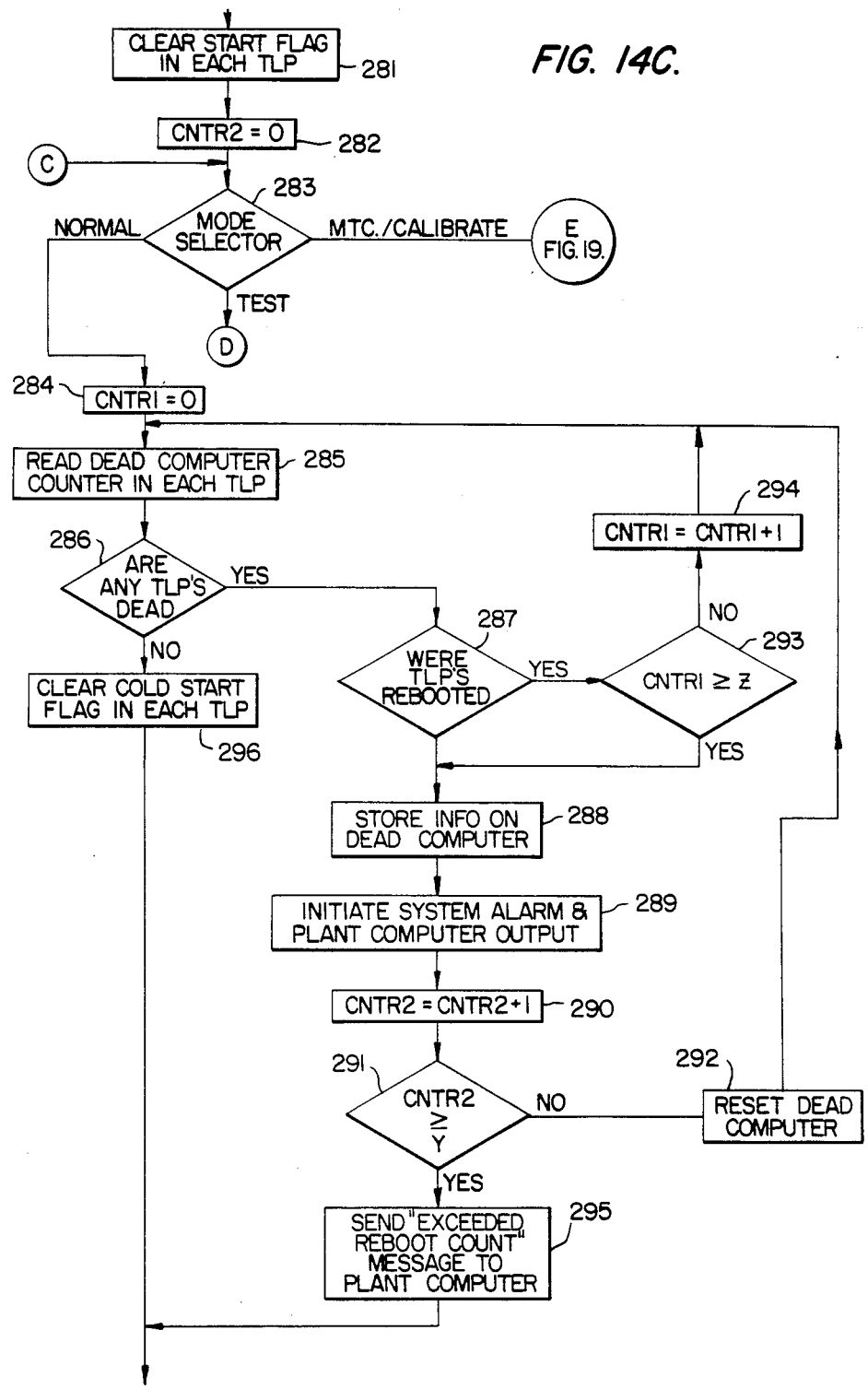
Figure 14D:
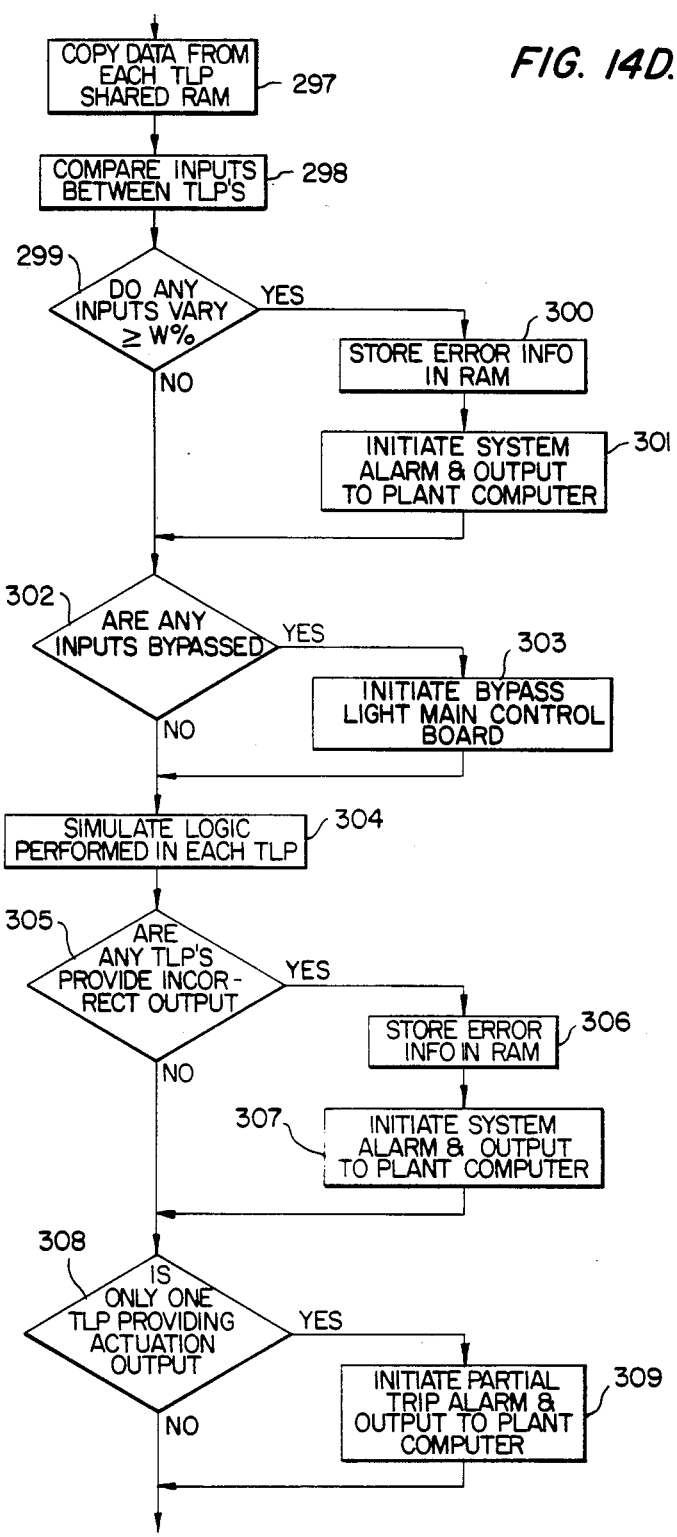
Figure 14E:
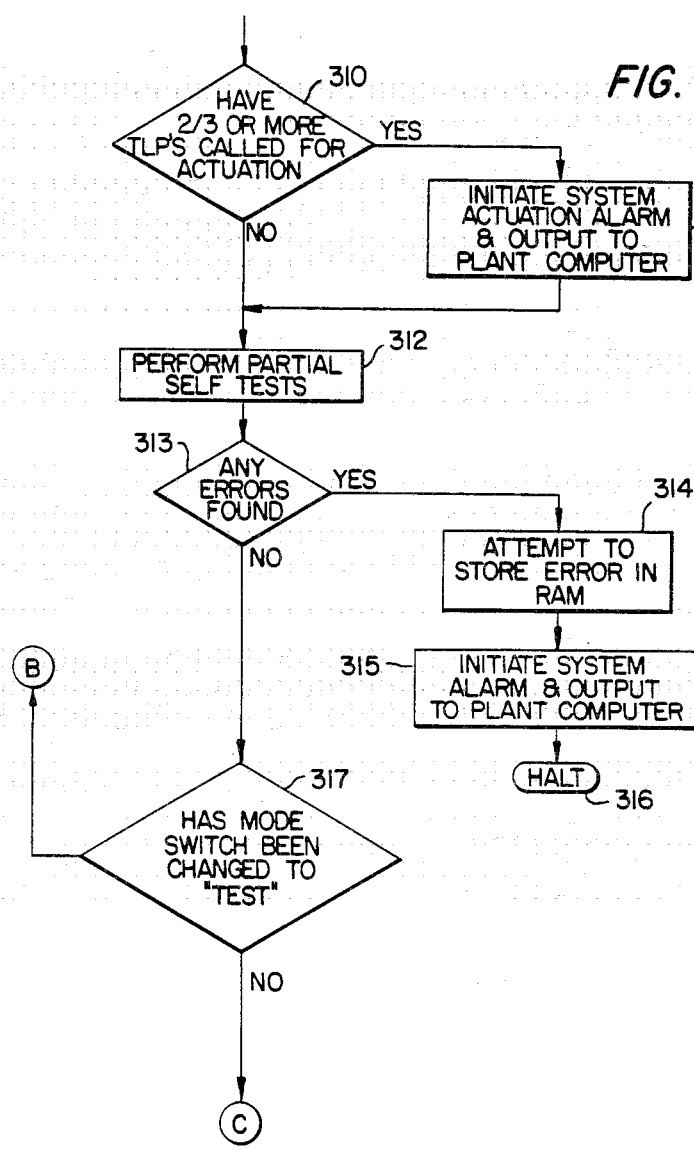
Figure 14F:
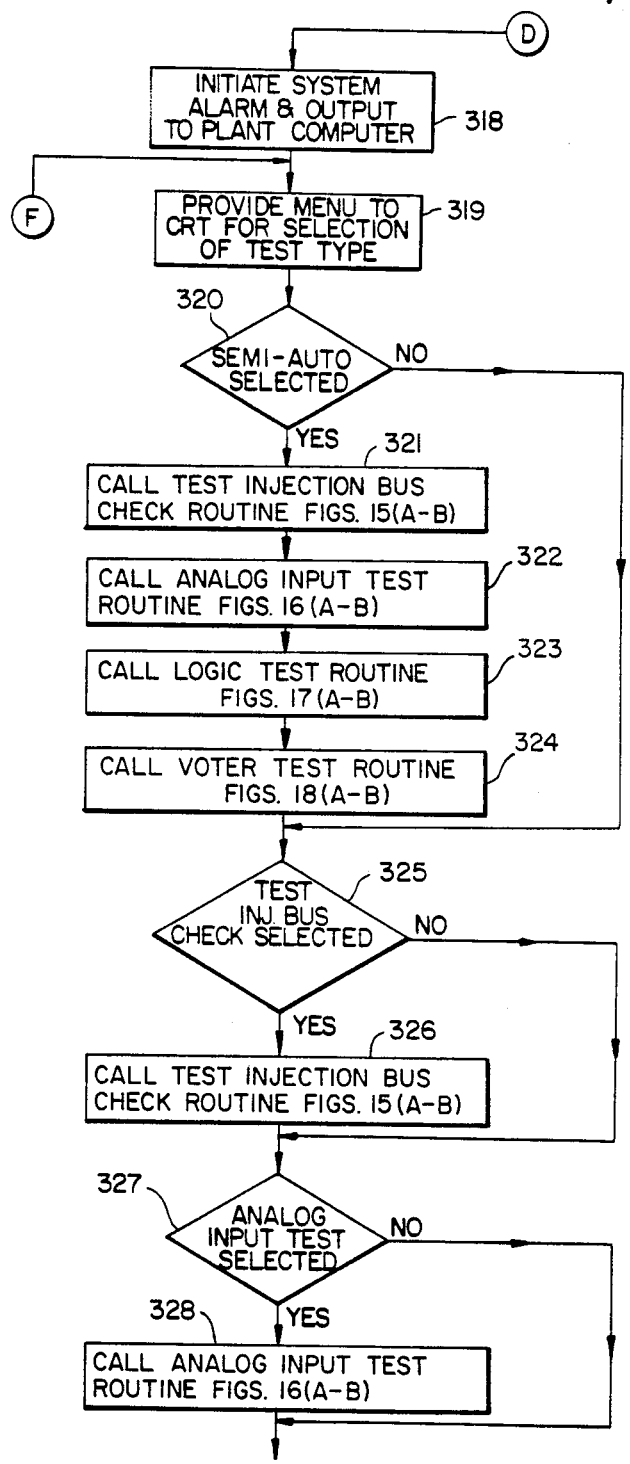
Figure 14G:
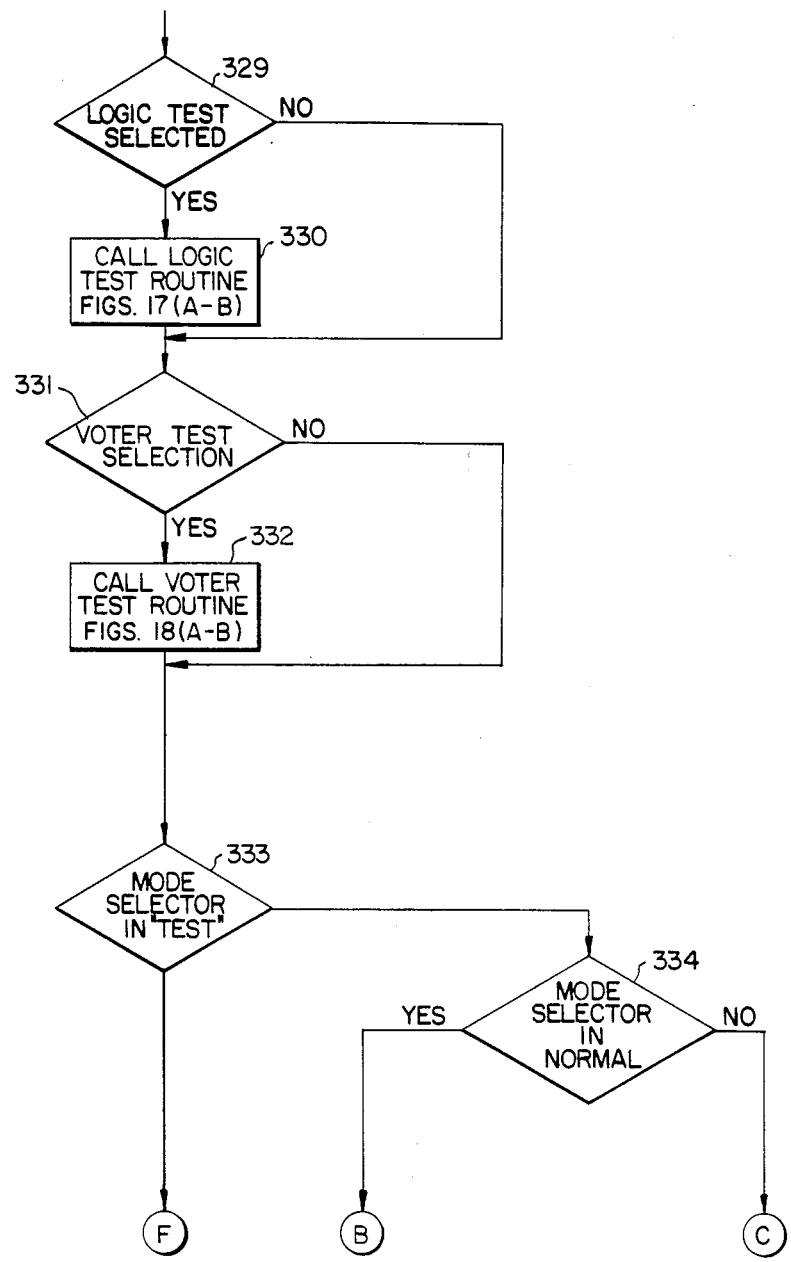

FIGS. 13(A-C) illustrate the flowchart for the program of each of the trip logic processors 60. At start-up (power-fail recovery 201, reboot 202, etc.), the trip logic processor 60 waits 204 for a predetermined length of time to make sure that the test processor 120 has started first. The trip logic processor 60 checks the start flag 205, in its shared RAM 65 that the test processor 120 can modify to have the trip logic processor 60 wait and the test processor waits until the flag is set to zero, or times out after a predetermined number of seconds. If a time out occurs 206, 207, the NVRAM 127 is checked for an error 208 and the trip logic processor 60 halts 211 if the NVRAM is not okay. If the NVRAM 127 is okay, a cold-start-flag is set 212. The trip logic processor 60 then checks 214 the cold start flag in RAM 65 that the test processor 120 can also modify to have the trip processor 60 do either cold start-up or warm startup. If a cold start is desired, then a RAM 65 test 215 and a ROM 63 test 217 occur. If an error occurs 216, 218 during memory tests, the processor 60 writes 219-221 the error into the shared RAM 65 and halts 220, 222.

During normal operation, the trip logic processor 60 checks 223 the new NVRAM flag in the RAM 65 that both it and the test processor 120 can modify to have the trip logic processor 60 pick up 224-226 the new values from NVRAM 127. When this initial operation is completed, trip logic calculations are begun according to predetermined trip logic. During this process, the analog inputs are sampled 227 and checked 228 against their proper ranges and validity flags are set 229 for the values out of range. Next, the digital inputs are read 230. If no inputs are bypassed or validity flags set, then the trip logic processor 60 does normal trip condition setting and logic calculations 232-234. If a bypass is indicated, then the trip logic is converted to ⅔ from 2/4 or 1/1 from ½ 236. After doing all logic calculations, an output to the voter 80 is produced 237 if necessary and then all the status information is written 238 into shared RAM 65 so that the test processor 120 can analyze the resultant information. After the logic calculations are finished, the trip logic processor does a partial test 239 of RAM 65 and partial test 243 of ROM 63, and on any error, the processor 60 writes the error into shared RAM 65 and halts 246 after which the trip increments the dead computer counter 247. If no halt has occurred, execution continues with the test of the new NVRAM flag 223. The trip logic process starting with the NVRAM flag test 223 should be completed in under one second since the major portion of the time allocated for mitigation actions is required for mechanical actions, such as starting the auxiliary feedwater pumps.

FIG. 14(A-G) is the flowchart for the start-up and operation control routines executed by the single board test computer 121. A start-up begins from either a powerfail recovery 250 or when the reset button is depressed 251. If start-up is from the reset and the mode is not normal, a branch occurs which continues the previous opeations. If in the normal mode, the start flag and cold start flag in each trip logic procesor 60 is set 254-256. Next, the test computer 121 performs the self tests (257, 263, 269, 275) for the shared RAM 123, ROM 126, NVRAM 127 and UART. The test processor can also test the power supply voltages and make sure cabinet temperature is not too high. On any error, the test processor 121 attempts to store the reason for the error in shared RAM 123, annunciate it by producing a system alarm, produce an output to the plant computer and if in the normal mode, halts otherwise the test processor 121, logs a message and attempts to proceed. After the self tests are completed, the start flag is cleared 281 and the mode switch is checked 283. Depending on the status, normal processing continues, testing is started or a maintainance/calibration routine (FIG. 19A-E) will be executed.

During normal operation, the test processor 121 checks the dead computer counter 285 flags from each trip logic processor 60. If there is a dead trip logic processor 60, an alarm is produced and several attempts 292 are made to reset the dead trip logic processors 60. If there are dead trip logic processor 60, a system alarm is annunciated and output to the plant computer 289, the appropriate trip logic processor dead counter is incremented 290, and information concerning what happened is stored 288. A reboot of the trip logic processor is tried if the number of retrys has not been exceeded 291, if exceeded the reboot count is sent 295 to the plant computer. When no dead trip logic processors 60 exist, cold start flag is 296 cleared for individual trip logic processors. The test processor 120 then copies 297 the data from the shared RAMs 65 of the trip logic processors 60 and proceeds to check the data.

First it checks inputs for validity 298 between trip logic processors 60. Next, the test processor 120 checks 299 for out of range values and if any one is found out of range again, this information is stored 300, a system alarm is produced and an output to the plant computer occurs 301. After the range check, the test processor 121 checks 302 for input channel bypasses and produces 303 outputs to the ATWS input bypass/trip light in control room and to the plant computer if necessary. The partial trip logic of each trip logic processor 60 is then simulated 304 and the outputs compared 305. If errors occur, the test processor 121 stores the information 306, annuciates and outputs to the plant computer 307. A partial trip output is checked for 308 and an alarm annunciation and output to plant computer are produced 309 if necessary. Next, an actuation is checked for 310 which also produces a system alarm and output 311 to the plant computer.

A periodic self test 312 is performed next which tests the RAM 123, ROM 126 and NVRAM 127 and on any error the reason is stored 314 in shared RAM 123, a system alarm is produced 315 along with an output to the plant computer, followed by a halt 316. At the end of the nomrmal mode a check 317 is made to determine if the test mode has been activitated, if not, a check 283 of the mode selector is made and either normal execution continues or the maintainance/calibration mode is entered. If the test mode has been activated control will be transferred to the test mode portion of the control routine.

At the beginning of the test control portion (FIG. 14F), an alarm and output to the plant computer is produced 318. A menu of selections available is then provided 319 to the terminal 170. If semiautomatic testing is selected each of the test routines is automatically called 321-324. If not the relevant test routines are called 326, 328, 330, 332. At the end of the tests, mode selection is checked 333, 334 and appropriate action taken.

Figure 15A:
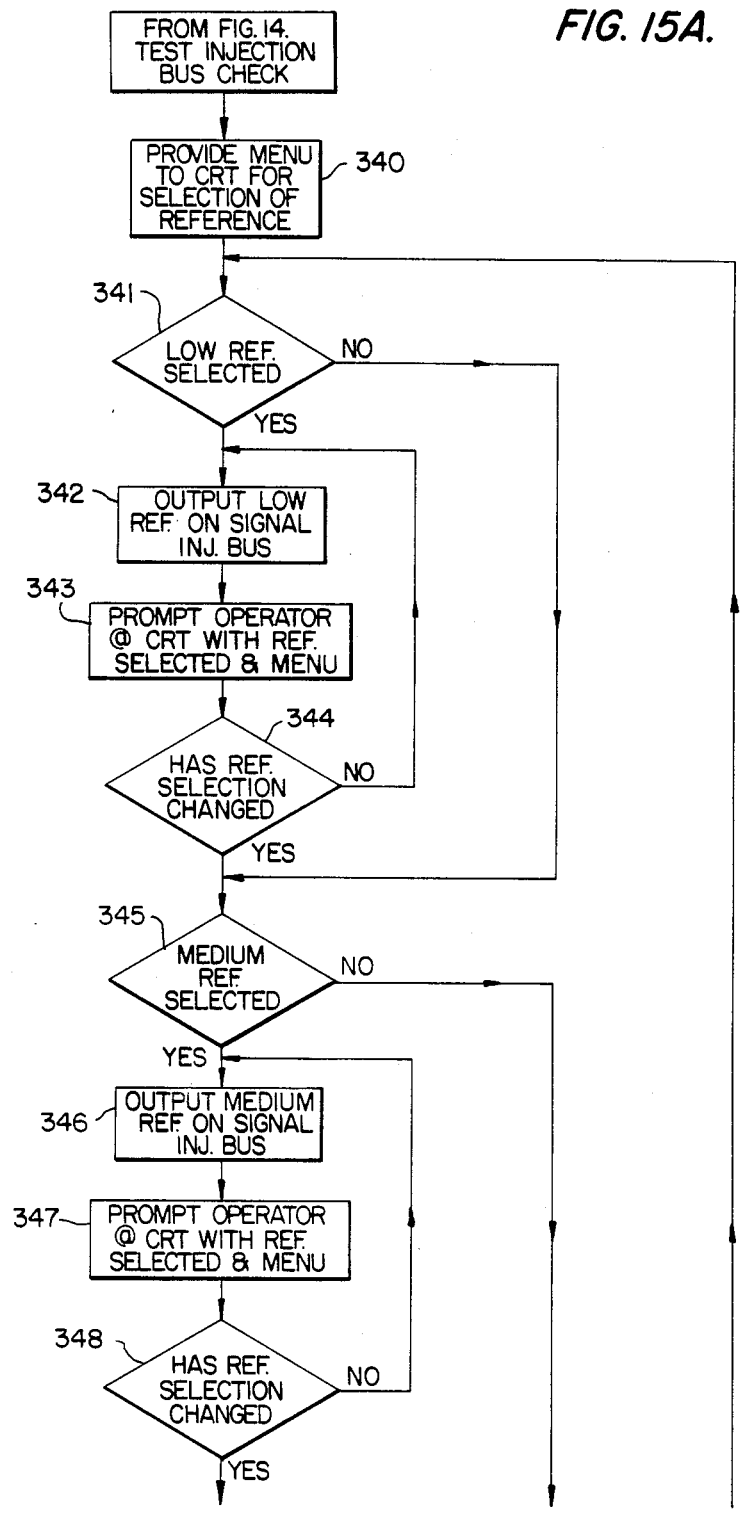
FIGS. 15 (A–B) comprise a flowchart of the test injection check routine called from FIG. 14.
Figure 15B:
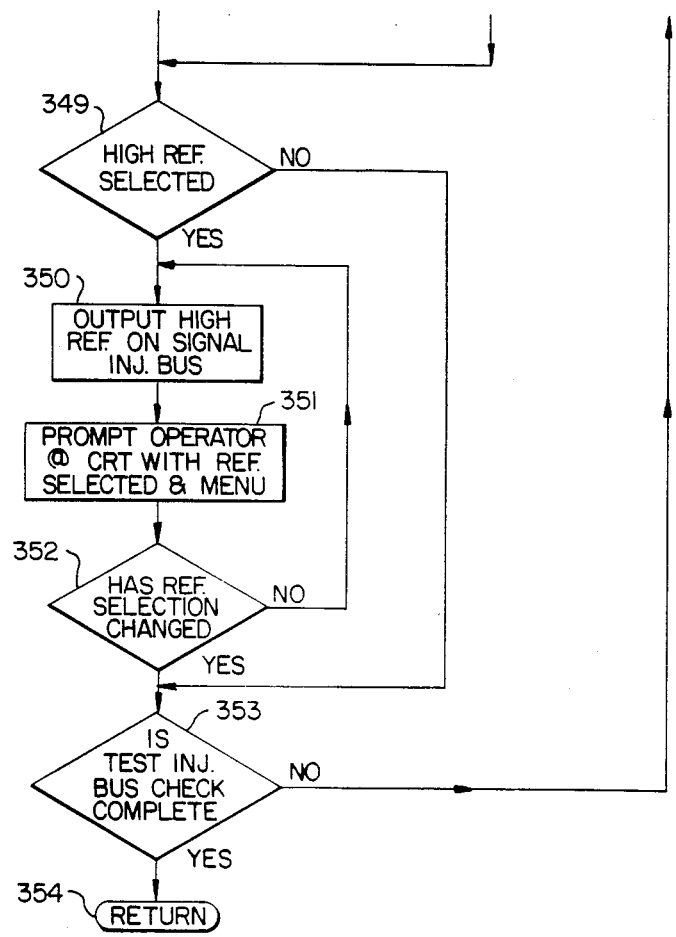

The test injection bus check is illustrated in FIGS. 15(A-B). At the beginning, a menu is provided at the terminal 170. Depending upon the selection either a low 342, medium 346 or high 350 value reference signal is output on reference line 133 and the operator receives a reference prompt and the menu. The operator can then connect a volt meter to the test panel 150 to verify that the proper value has been produced. If improper the operator can make the necessary adjustments. After the injection test routine is finished a return 354 is made to the test control portion of the control routine.

Figure 16A:
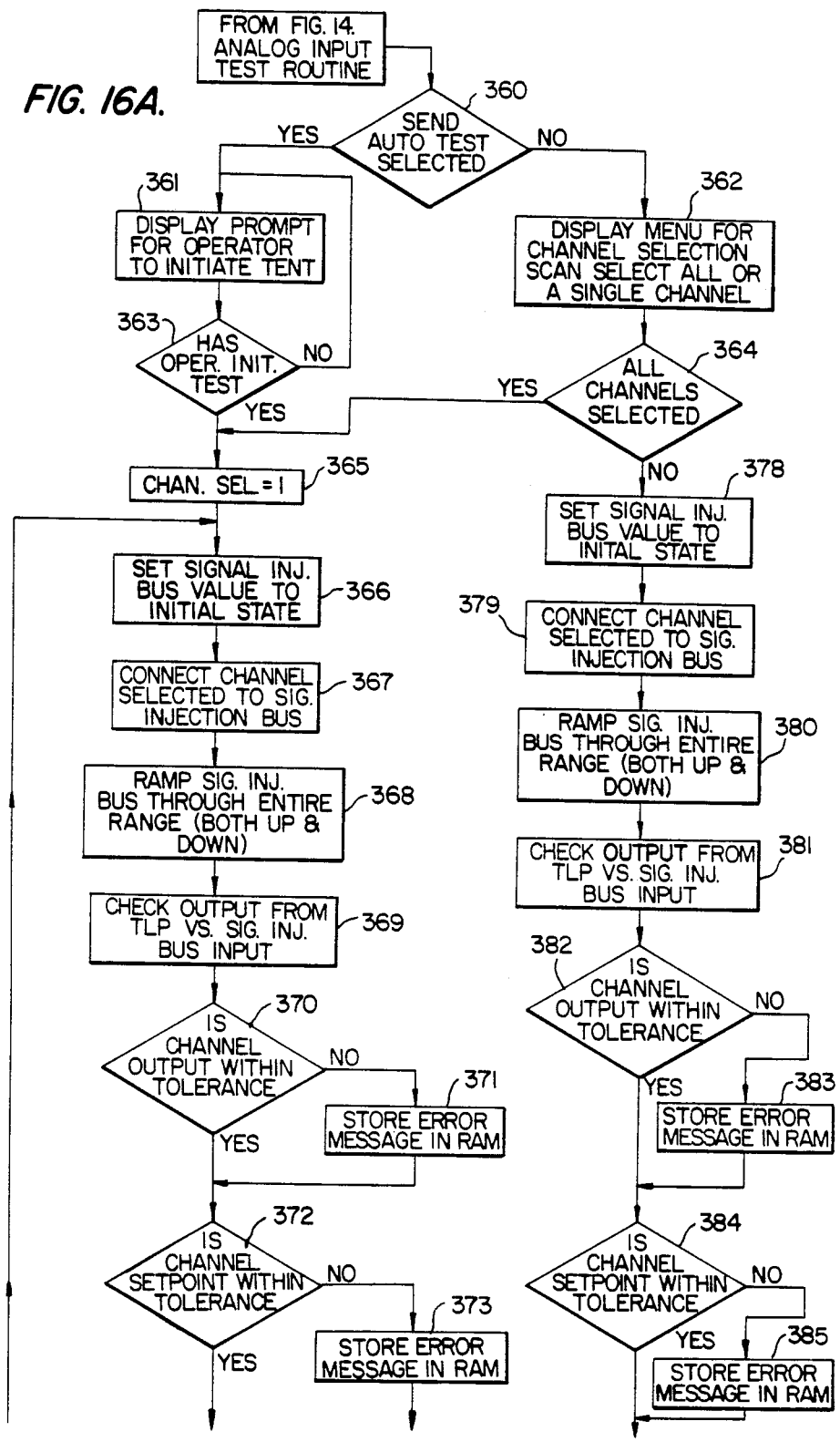
FIGS. 16 (A–B) comprise a flowchart of the analog input test routine called from FIG. 14.
Figure 16B:
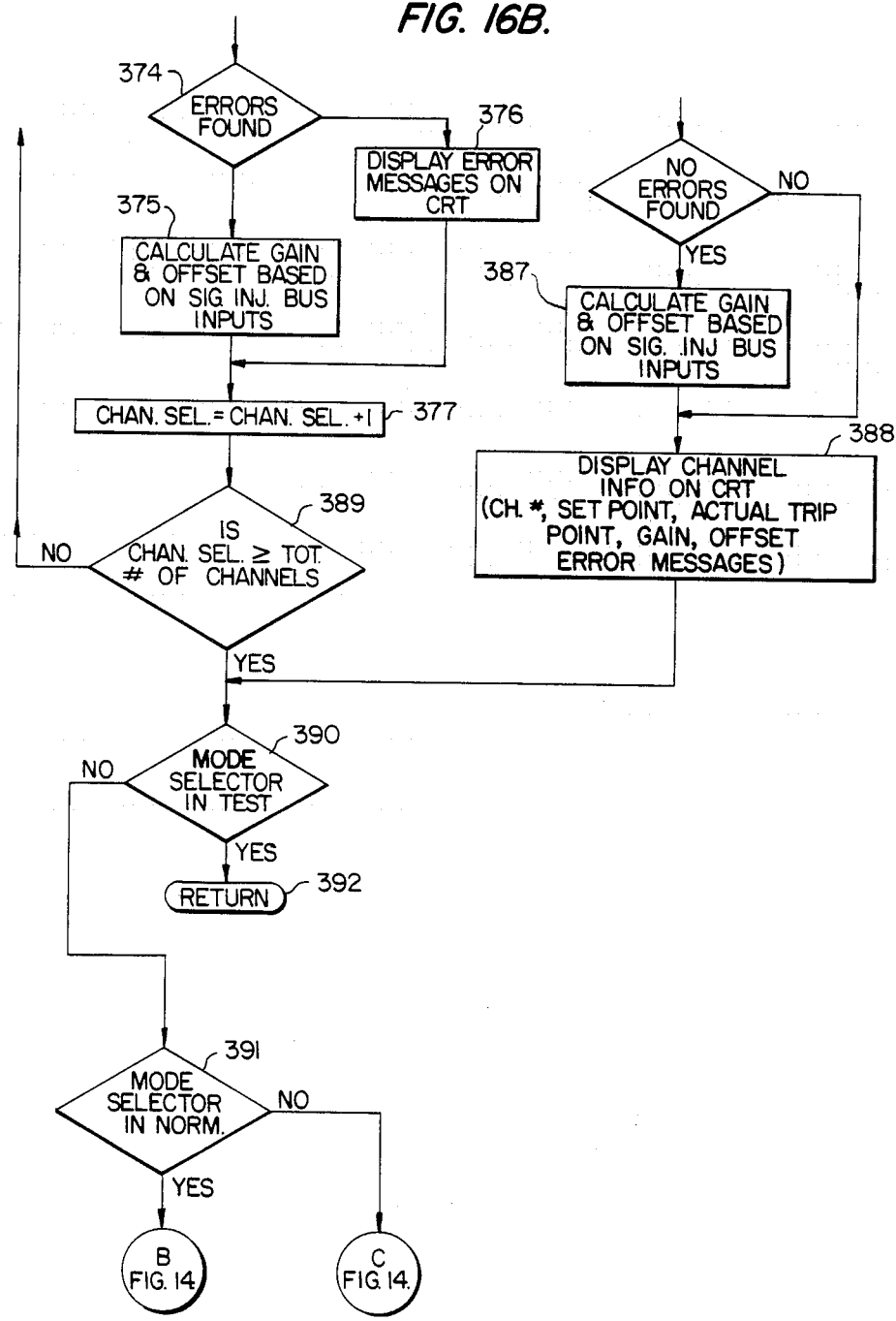

The analog input test routine illustrated in Figs. 16(A-B) starts with a display of a prompt 361 or a selection menu 362. When either all channels or a single channel is selected for testing, substantially the same functions are performed. First the signal injection line 133 is set 366 to an initial state and the appropriate relays 45, 46 for the channel are activatied 367. After a settling time for the relays of from 2 to 20 seconds the value on the injection bus 133 is ramped 368 up and down and the output of the appropriate trip logic processor 60 is compared 369 with the ramped input. When the channel output 370 and set point 372 is not within a predetermined tolerance an error message is stored 371, 373 in RAM 123. If no errors are found the gain and offset for the channel are calculated 375 and stored in NVRAM 127 and sent to the appropriate test logic processor. In the automatic mode the various values are displayed 388 on the terminal 170. At the end of the test, control returns 392 to the control routine.

Figure 17A:
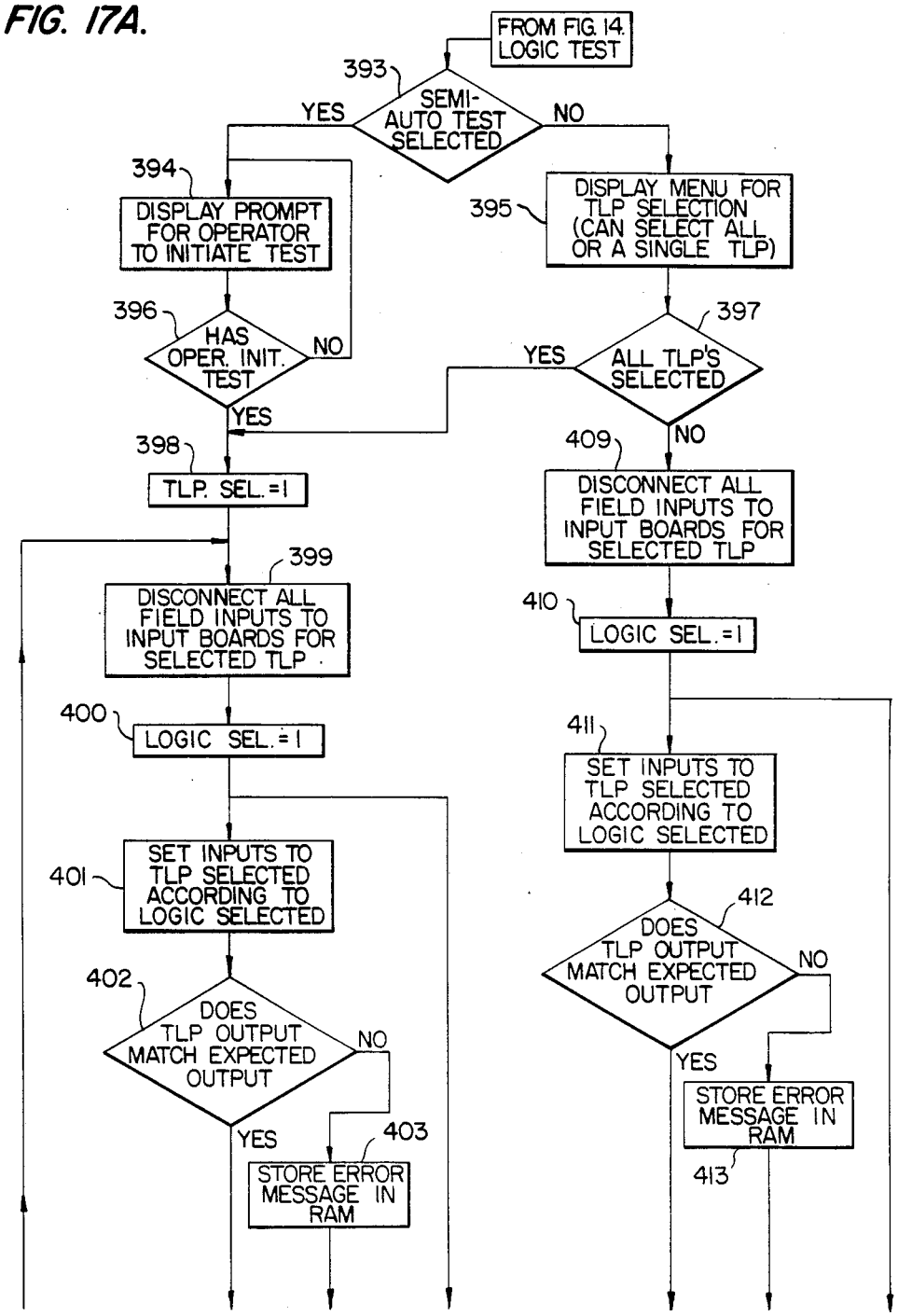
FIGS. 17 (A–B) comprise a flowchart of the logic test routine called from FIG. 14.
Figure 17B:
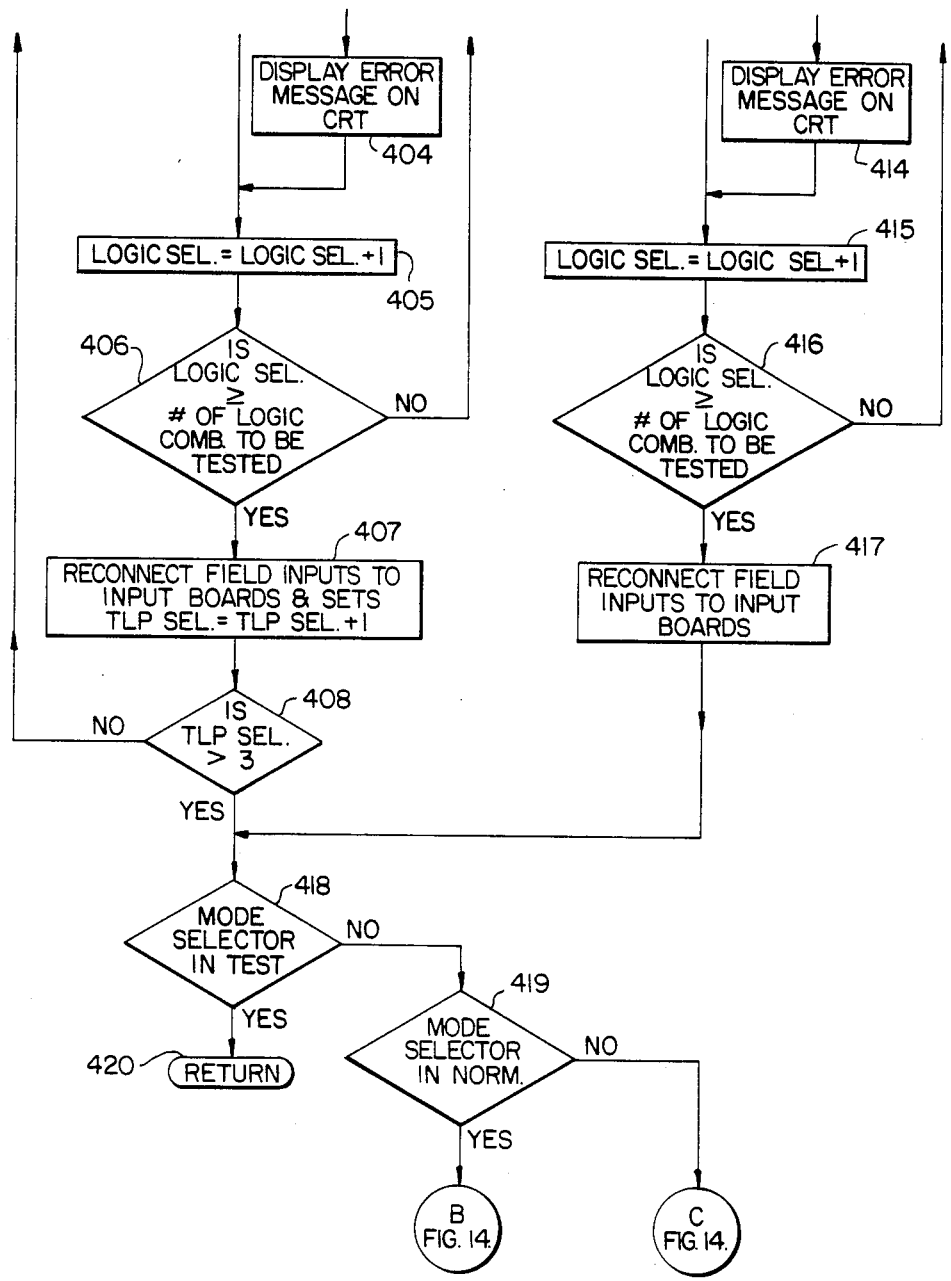

The logic test routine is illustrated by Figs. 17(A-B). The semiautomatic and operator controlled tests are conducted in substantially the same manner. After a prompt or a menu display, all field inputs are disconnected 399 by activating the appropriate relays 45, 52. Other appropriate relays 46, 47, 53 are then set 401 for the desired logic combination. The outputs of the trip logic processor are then compared 402 to the inputs and error messages are stored 403 and displayed 404. At the end of each test the field inputs are reconnected 406. At the end of the logic test routine control returns 420 to the control routine (FIG. 14).

Figure 18A:
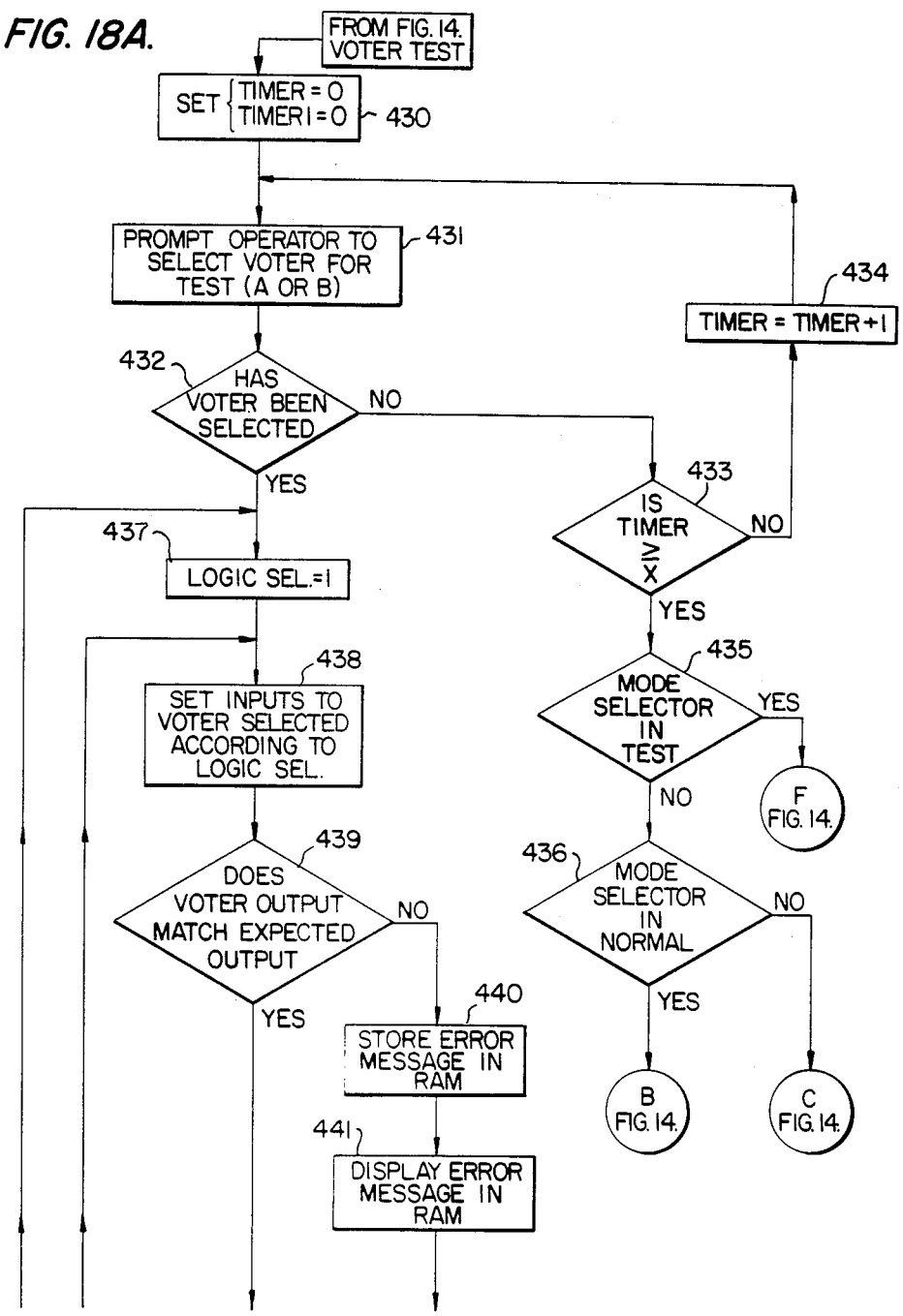
FIG. 18,(A–B) comprise a flowchart of the voter test routine called from FIG. 14.
Figure 18B:
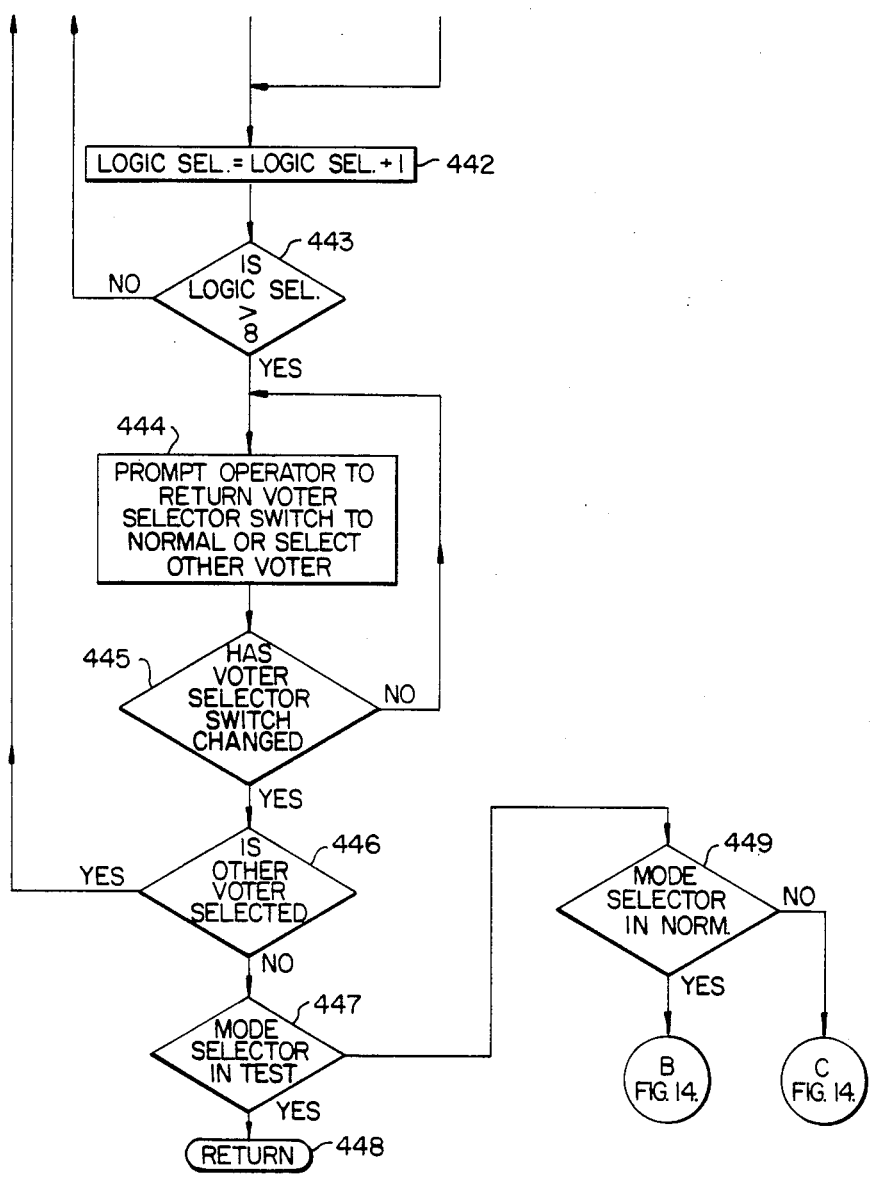
Figure 19A:
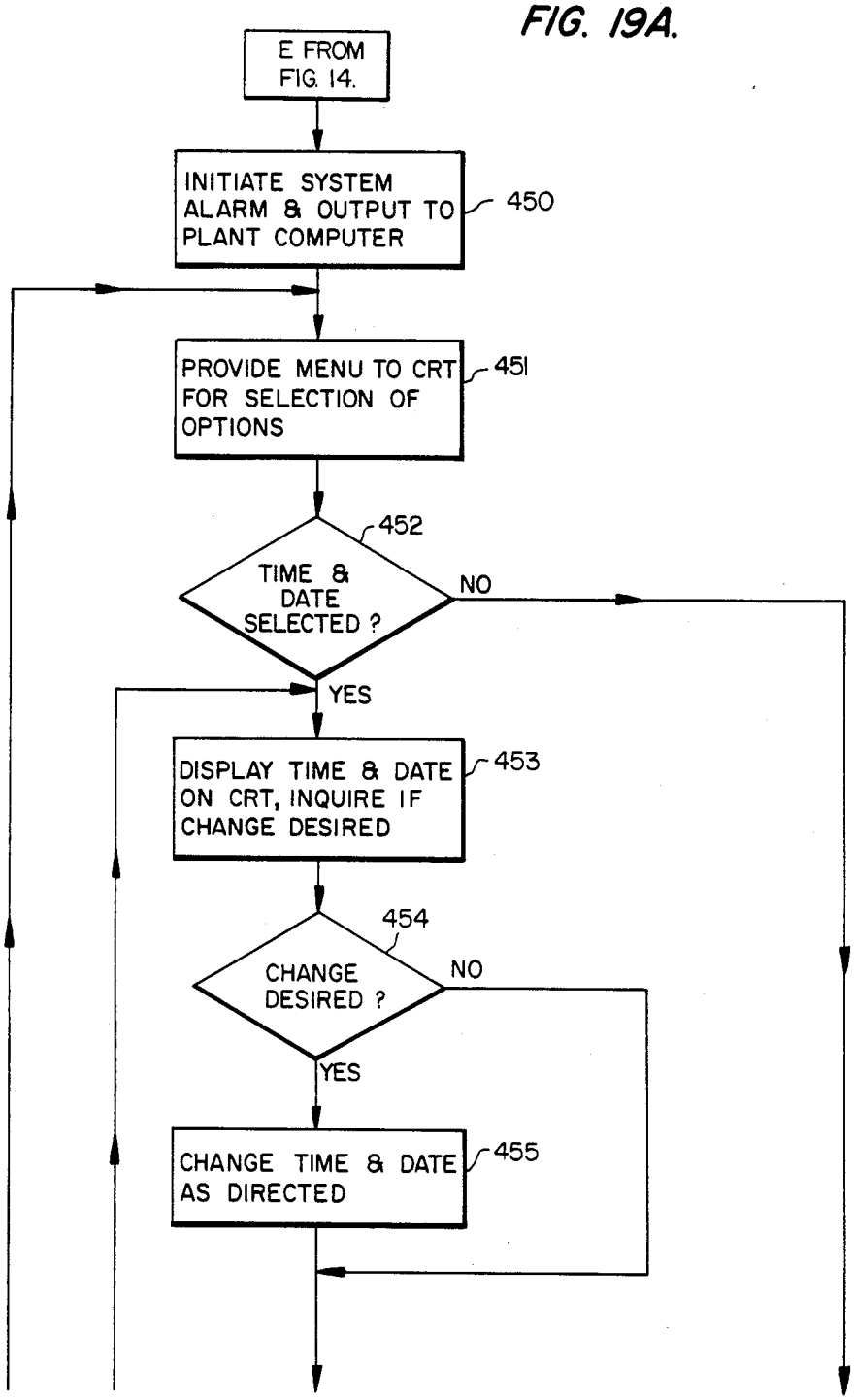
FIGS. 19 (A–E) comprise a flowchart of a calibration and maintainance routine called from FIG. 14.
Figure 19B:
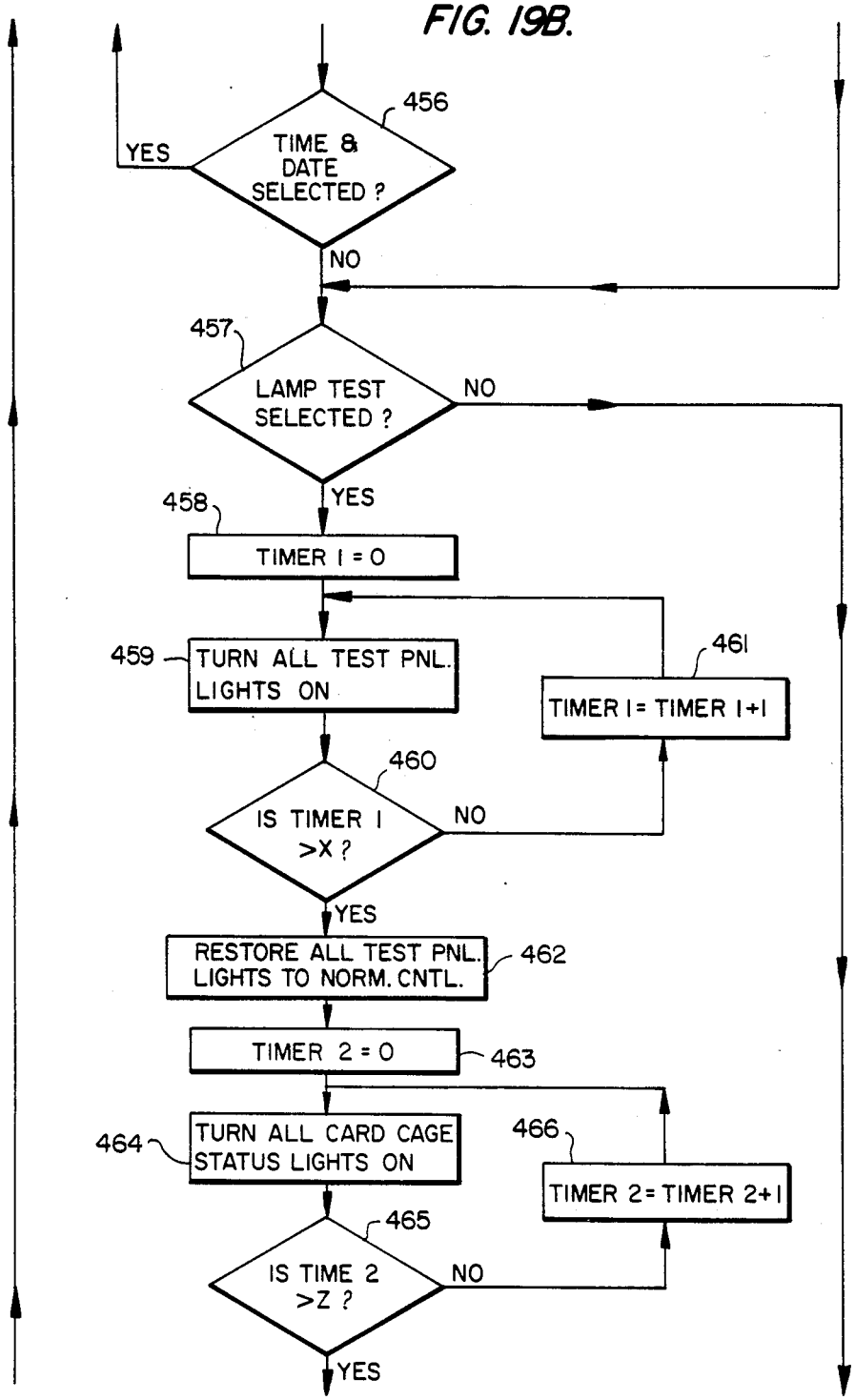
Figure 19C:
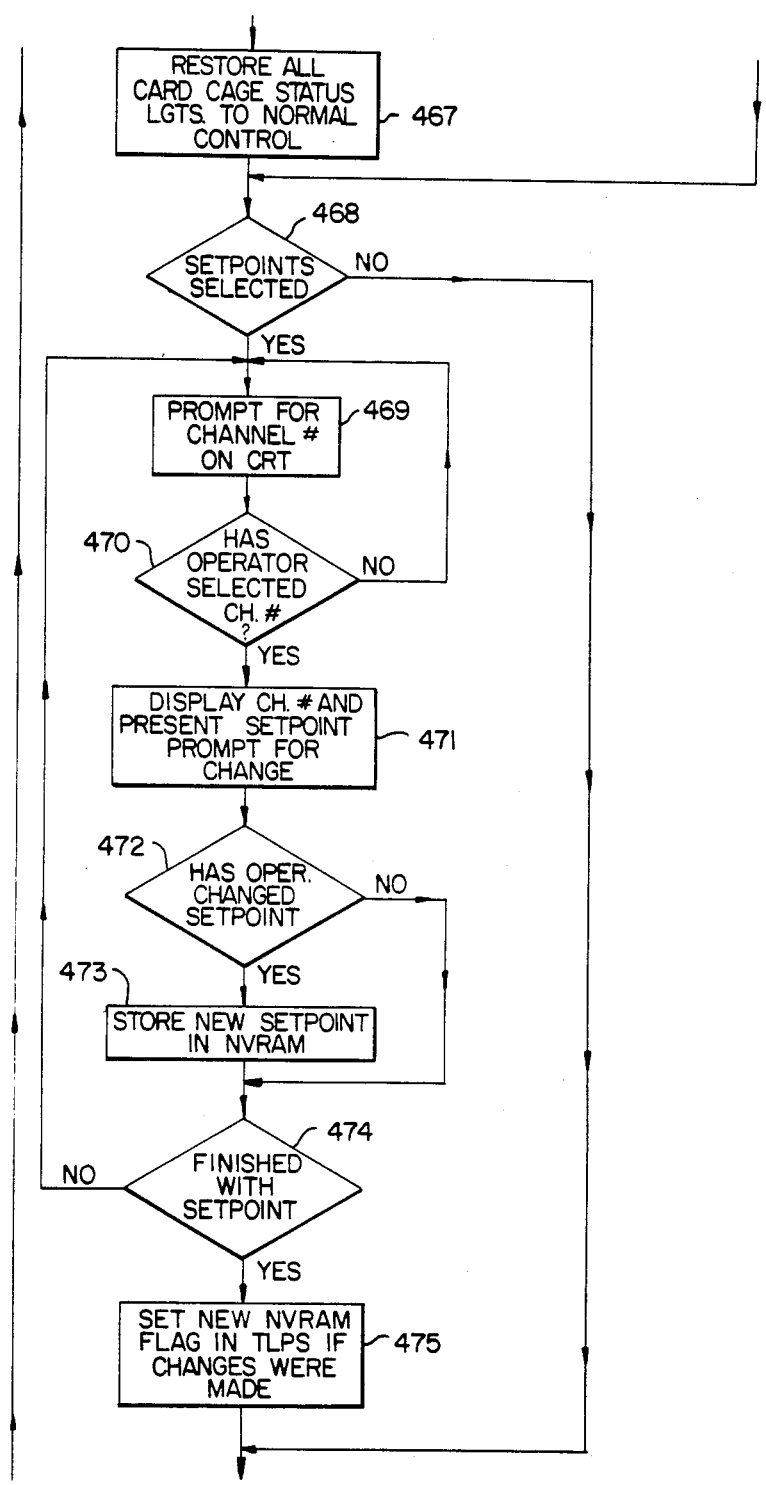
Figure 19D:
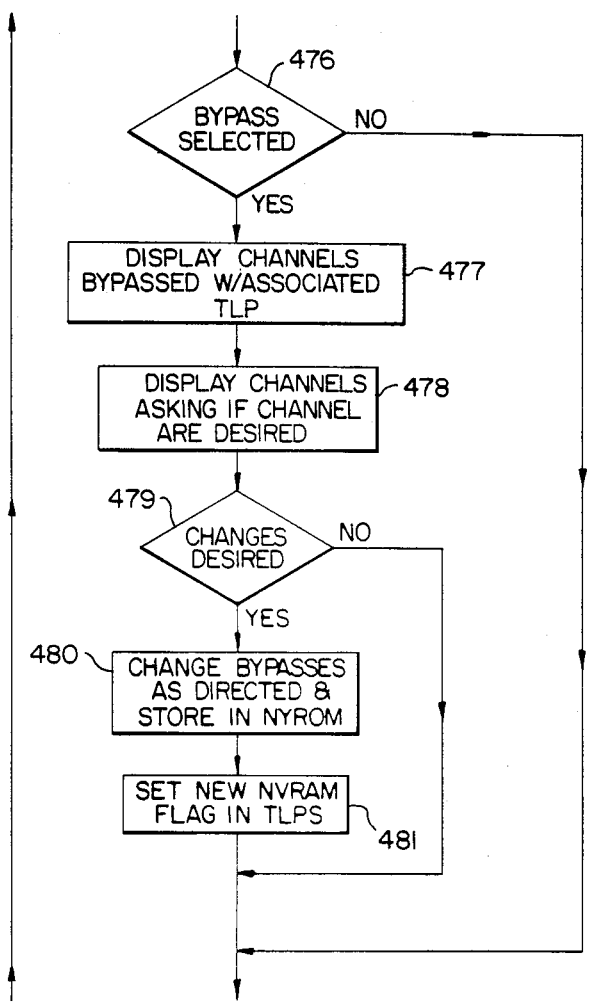
Figure 19E:
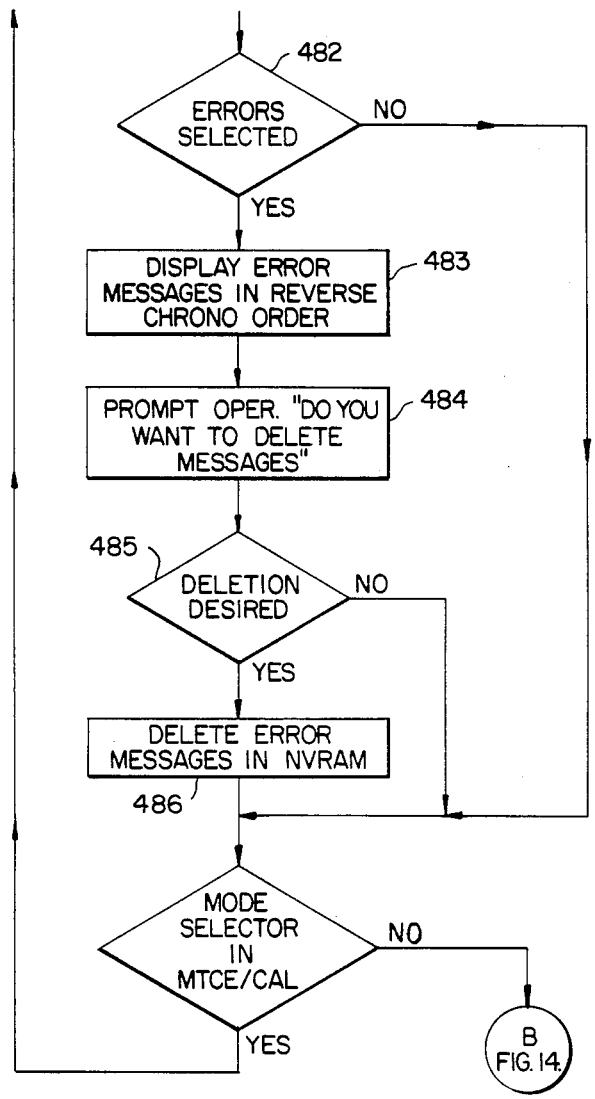

The voter test, illustrated in FIGS. 18(A-B) starts with an operator prompt 431 for voter selection. If the operator does not respond within a predetermined time control returns to the control routine When a voter is selected, the inputs to the voter are set 438 according to the logic selected. The voter output is then compared 439 to the input and if in error the error is stored 440 in NVRAM 127 and displayed 441 on the terminal 170. The operator can then select 444 the other voter or return to normal mode. At the end of this test, control returns 448 to the control routine (FIG. 14).

The maintenance and calibration routine is illustrated in FIGS. 19 (A-E). At the beginning of the routine an alarm is produced 450 and the plant computer is notified. Next a menu is provided 451 to the operator. During the time and date routine 453–456 the time and date can be changed. If lamp test is selected all panel 459 and card cage lights 464 are turned on so the operator can visually inspect them. Before the end of the lamp test all the lights are returned to normal. If set points are to be changed the operator is prompted 469 and the change is stored 473 in NVRAM 127 after which the trip logic processor 60 shared RAMS 65 are updated 475. If channel bypass is selected the appropriate flags in the NVRAM 127 and shared RAMS 65 are changed 480,481. When error display is selected the error messages are removed from NVRAM 127 and displayed in reverse chronological order, after which the error messages are deleted. At the end of the routine, control is returned to the control routine.

The many features and advantages of the invention are apparent from the detailed specification and, thus, it is intended by the appended claims to cover all such features and advantages of the system which fall within the true spirit and scope of the invention. Further, since numerous modifications and changes will readily occur to those skilled in the art, it is not desired to limit the invention to the actual construction and operation illustrated and described, and, accordingly, all suitable modifications and equivalents may be resorted to, falling within the scope of the invention.

We claim as our invention:

1. A control system protection system receiving control status signals from control system sensors and contacts, and actuating control system protection devices, said protection system comprising:
    input conditioning means, receiving said status signals, for conditioning the status signals;
    at least three trip logic processing means, each receiving the conditioned status signals, each for producing a partial trip signal in dependence upon the conditioned status signals and a predetermined partial trip logic scheme, and including means for performing set point comparisons of the conditioned status signals, logically combining the set point compared signals and determining coincidence between the logically combined signals to produce the partial trip signals;
    voting means responsive to the partial trip signals for producing an actuation signal in dependence upon the partial trip signals in accordance with a predetermined trip signal voting scheme; and
    power interface means, responsive to the actuation signal, for actuating the control system protection devices in dependence upon the actuation signal.

2. A system as recited in claim 1, wherein said predetermined trip signal voting scheme provides for the control systems protection devices to be actuated if at least two partial trip signals are produced by said at least three trip logic processing means.

3. A system as recited in claim 1, wherein said voting means comprises at least two voters connected between said trip logic processing means and said power interface means.

4. A control system protection and testing system receiving control system status signals from control system sensors and actuating control system protection devices, said protection and testing system comprising:
    test processing means for producing trip logic and voter test signals and sampling trip logic and voter test result signals;
    input conditioning means, operatively connected to said test processing means and receiving the status signals, for conditioning the status signals and substituting the trip logic test signals for the status signals;
    at least three trip logic processing means, each operatively connected to said test processing means and each receiving one of the conditioned status signals and the trip logic test signals, each for producing a single partial trip signal in dependence upon a predetermined trip logic scheme and one of the conditioned status signals and the trip logic test signals, and said test processing means sampling the partial trip signals as the trip logic test result signals and producing a trip logic processing means failure indication when the trip logic test result signals from said trip logic processing means do not agree or are in error;
    voting and actuation means, operatively connected to said test processing means and to receive the partial trip signals, for producing an actuation signal in dependence upon a predetermined voting scheme and one of the partial trip signals and the voter test signals, for actuating the control system protection devices in dependence upon the actuation signal when the voter test signals are not being produced and for outputting the voter test result signals when the voter test signals are being produced, and said test processing means producing a voting means failure indication when the voter test result signals are in error.

5. A system as recited in claim 4, wherein said trip logic test signals include a ramped analog signal and maximum and minimum value signals, said test processing means produces sample values and set point values from said ramped analog signal, set point values from said maximum and minimum value signals and produces the partial trip signal from the set point values, and said test processing means compares the set point values with the ramped analog signal and produces an input failure indication when an error occurs, and compares the minimum and maximum value signals to the trip signal and produces the partial trip logic processing failure indication when in error.

6. A system as recited in claim 4, wherein said test processing means comprises:
   a test system processor connected to said trip logic processing means;
   a digital-to-analog converter connected to said test system processor and said input conditioning means; and
   a digital input/output unit connected to said test system processor, said input conditioning means and said voting and actuation means.

7. A system as recited in claim 6,
   wherein each of said trip logic processing means comprises a trip logic processor, and
   wherein said system further comprises a single bus interconnecting said trip logic processors, said test system processor, said digital-to-analog converter and said digital input/output unit.

8. A system as recited in claim 6,
   wherein each of said trip logic processing means comprises a trip logic processor, and
   wherein said system further comprises:
      at least three trip logic buses connected to respective trip logic processors;
      a test system bus connected to said test system processor, said digital-to-analog converter and said digital input/output unit; and
      parallel to serial communication devices connected between said trip logic buses and said test system bus.

9. A system as recited in claim 4,
   wherein said test processing means produces switching signals, a ramp test signal, a ramp test enable signal, reference test enable signals and digital test signals and digital test enable signals; and
   wherein said system further comprises:
      reference voltage means for providing reference voltages; and
      selection means, operatively connected to receive said status signals and to said test processing means and one of said trip logic processing means, for providing one of the status signals, the ramp test signal, the reference voltages and the digital test signals to the one of said trip logic processing means in dependence upon the switching, the ramp test enable, the reference test enable and digital test enable signals.

10. A system as recited in claim 4, wherein the predetermined partial trip signal voting scheme is a two out of three voting scheme.

11. A system as recited in claim 4, wherein said voting and actuation means comprises:
   at least two voters connected to said test processing means and said trip logic processing means; and
   actuators connected to said voters.

12. A system as recited in claim 4, wherein said actuators comprise:
   a relay having a coil connected to one of said voters and for actuating the control system protection devices; and
   means for applying a test voltage to the coil when the voter test signals are produced.

13. An auxiliary reactor protection and protection testing system for a pressurized light water nuclear power plant, said system receiving steam generator level sensor signals from steam generator level sensors, main feedwater flow sensor signals from main feedwater flow sensors and contact inputs from contacts for valves and components in the plant and activating reactor protection devices, said system comprising:
   a test processor producing test enable signals, analog and digital input test signals, voter test enable signals and voter test signals;
   at least three sensor and contact signal conditioning units, each connected to the steam generator level main feedwater flow sensors, to the valve and component contacts and to said test processor, and each responsive to the test enable signals to produce one of the analog and digital input test signals and the sensor signals as conditioned sensor and contact signals;
   at least three trip logic processors, each connected to said test processor and to the respective signal conditioning unit, each producing sensor value signals equivalent to the values of the conditioned sensor signals, each producing set point signals when the sensor value signals are within a predetermined set range, and each producing a partial trip signal in dependence upon a predetermined trip logic scheme and the set point signals and the contact signals;
   at least two voter testing units, each connected to said test processor and said trip logic processors, each outputting one of the voter test signals and the partial trip signals;
   at least two voter units, connected to the respective voter testing units, each producing an actuation signal in dependence upon a predetermined voting scheme and the partial trip signals and each producing a test actuation signal in dependence upon the predetermined voting scheme and the voter test signals; and
   relays, connected to said voter units and said voter testing units, activating the reactor protection devices in dependence upon the actuation signal and transmitting therethrough the test actuation signals, where said voter testing units transmit the test actuation signals to said test processor; and
   said test processor sampling the sensor value signals, the set point signals and the partial trip signals, producing trip logic processor failure indications when the trip signals are in error, producing partial trip status indications and operator alert signals in dependence upon the sensor value signals, producing an input failure indication when a comparison of the input test signals and the set point signals indicates an error, sampling the test actuation signals and producing voter unit failure indications when a comparison of the voter test signals and actuation signals indicate an error.

14. A system as recited in claim 13, wherein each of said conditioning units comprises:
   an analog input board including:
      reference and ground voltage sources;
      a first relay, connected to said test processor and said reference and ground voltage sources, for switching between the reference and ground sources in dependence upon the test enable signals;
      a second relay, connected to said first relay and said test processor, for switching between the first relay and the analog input test signals in dependence upon the test enable signals; and a third relay, connected to one of the sensors, said second relay, said test processor and one of said trip logic processors, for switching between the second relay and the one of the sensors in dependence upon the test enable signals; and a digital input board including:

a current loop;

a first pair of relays, connected to said test processors and said current loop, for switching to and from said current loop in dependence upon the test enable signal; and a second pair of relays, connected to said first pair of relays, said test processor and one of the contacts, for switching between the first pair of relays and the one of the contacts.

15. A system as recited in claim 13, wherein each of said voter testing units comprises:

first switches, connected to said test processor and the respective said voter unit, for switching the voter test signals produced by said test processor to the respective said voter unit;

second switches, connected to the respective said voter unit and said test processor, for providing one of an actuation voltage sufficient to actuate said relays and the test actuation signal to said relays; and an optocoupler, connected between said second switches and said test processor, for providing the test actuation signal to said test processor.

16. A system as recited in claim 13, further comprising a single bus over which said test processor and said trip logic processors communicate.

17. A system as recited in claim 16, further comprising at least three analog to digital converters connected between respective conditioning units and trip logic buses.

18. A system as recited in claim 13, further comprising:

at least three trip logic buses connected to and associated with respective trip logic processors;

a test system bus connected to said test processor; and parallel-to-serial communication devices connected between said trip logic buses and said test system bus.

19. A method of providing an auxiliary reactor protection actuation signal to a power interface level of a reactor protection system where inputs are provided by plant sensors and contacts, said method comprising:

(a) sampling and conditioning outputs from the sensors and contacts;

(b) producing partial trip signals from the sampled outputs using a triply redundant predetermined partial trip logic scheme including:

(bi) performing set point comparisons of the outputs;

(bii) logically combining the set point compared outputs; and (biii) determining coincidence between the logically combined set point compared outputs to produce the partial trip signals; and (c) producing and providing the actuation signal directly to the power interface level using a doubly redundant predetermined voting scheme voting on the partial trip signals.

20. A method as recited in claim 19, wherein said predetermined voting scheme produces the actuation signal when at least two partial trip signals are produced.

21. A testing method for an auxiliary reactor protection system including sensor input signal conditioning units for sampling reactor sensors and contacts, at least three trip logic processors executing the same predetemined trip logic scheme, at least two voting units each executing a predetermined voting scheme on outputs of the trip logic processors, and relays responsive to the voting units for activating reactor protection devices, said method comprising:

(a) interrupting inputs to the signal conditioning units and providing trip logic test signals thereto;

(b) sampling outputs of the trip logic processors, comparing the trip logic processor outputs with the trip logic test signals and producing a first failure indication when the trip logic processor outputs are in error;

(c) providing voter testing signals to the voter units;

(d) providing a nonactuation power level to the relays; and (e) sampling coil signals of the relays, comparing the coil signals with the voter test signals and producing a second failure indication when the coil signals are in error.

* * * * *